US010444890B2

(12) United States Patent
Kim

(10) Patent No.: US 10,444,890 B2
(45) Date of Patent: Oct. 15, 2019

(54) MOBILE TERMINAL AND CONTROL METHOD THEREOF

(71) Applicant: LG ELECTRONICS INC., Seoul (KR)

(72) Inventor: Jonghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 394 days.

(21) Appl. No.: 14/439,358

(22) PCT Filed: Jan. 8, 2014

(86) PCT No.: PCT/KR2014/000185
§ 371 (c)(1),
(2) Date: Apr. 29, 2015

(87) PCT Pub. No.: WO2015/056844
PCT Pub. Date: Apr. 23, 2015

(65) Prior Publication Data
US 2015/0277652 A1 Oct. 1, 2015

(30) Foreign Application Priority Data
Oct. 18, 2013 (KR) .................. 10-2013-0124773

(51) Int. Cl.
G06F 3/041 (2006.01)
H04M 1/67 (2006.01)
(Continued)

(52) U.S. Cl.
CPC ............ *G06F 3/0416* (2013.01); *G06F 21/32* (2013.01); *G06K 9/00892* (2013.01); *G06K 9/46* (2013.01);
(Continued)

(58) Field of Classification Search
CPC ... G06F 3/0416; G06F 21/32; G06K 9/00892; G06K 9/46; G06K 2009/4666;
(Continued)

(56) References Cited

U.S. PATENT DOCUMENTS 5,852,670 A * 12/1998 Setlak .................. G06K 9/0002
382/126
2005/0270140 A1* 12/2005 Oh ..................... G06K 9/00006
340/5.83

(Continued)

FOREIGN PATENT DOCUMENTS

CN 101374171 2/2009
CN 101482921 7/2009
(Continued)

OTHER PUBLICATIONS

European Search Report dated Apr. 19, 2017 issued in Application 14854144.4.
(Continued)

*Primary Examiner* — Amare Mengistu
*Assistant Examiner* — Gloryvid Figueroa-Gibson
(74) *Attorney, Agent, or Firm* — Ked & Associates, LLP

(57) ABSTRACT

A mobile terminal capable of sensing a touch and a fingerprint and a control method thereof are provided. The mobile terminal capable of performing a fingerprint recognition function includes: a sensing unit configured to sense a fingerprint of a user's finger when the user's finger touches a display unit, in a state in which the fingerprint recognition function is executed; and a controller configured to determine whether to perform an operation related to an event that occurs in the mobile terminal on the basis of a degree of recognition of the sensed fingerprint.

15 Claims, 19 Drawing Sheets

(51) Int. Cl.
*G06K 9/46* (2006.01)
*G06Q 20/40* (2012.01)
*G06F 21/32* (2013.01)
*G06K 9/00* (2006.01)
*H04W 12/06* (2009.01)
*H04M 1/725* (2006.01)
*H04L 29/06* (2006.01)
*H04W 12/00* (2009.01)

(52) U.S. Cl.
CPC .............. *G06Q 20/40* (2013.01); *H04M 1/67* (2013.01); *H04W 12/06* (2013.01); *G06K 2009/4666* (2013.01); *H04L 63/0861* (2013.01); *H04L 63/102* (2013.01); *H04M 1/72519* (2013.01); *H04M 1/72552* (2013.01); *H04M 1/72563* (2013.01); *H04W 12/00508* (2019.01)

(58) Field of Classification Search
CPC .............. H04M 1/67; H04M 1/72519; H04M 1/72552; H04M 1/72563; G06Q 20/40
USPC ......................................................... 345/173
See application file for complete search history.

(56) References Cited

U.S. PATENT DOCUMENTS

| | | | | |
|---|---|---|---|---|
| 2006/0210126 A1* | 9/2006 | Cho | ................... | G07C 9/00158 382/124 |
| 2009/0097718 A1* | 4/2009 | Li | .......................... | H04N 5/232 382/124 |
| 2010/0231356 A1* | 9/2010 | Kim | ...................... | G06F 3/048 340/5.83 |
| 2010/0240415 A1* | 9/2010 | Kim | .................... | G06F 3/03547 455/565 |
| 2012/0127179 A1 | 5/2012 | Aspelin | | |
| 2014/0354556 A1* | 12/2014 | Alameh | .................. | G06F 21/32 345/173 |
| 2015/0074615 A1* | 3/2015 | Han | ................... | G06K 9/00033 715/863 |
| 2015/0135108 A1* | 5/2015 | Pope | .................. | G06K 9/00006 715/767 |

FOREIGN PATENT DOCUMENTS

| | | |
|---|---|---|
| CN | 102075601 | 5/2011 |
| EP | 2 892 002 | 7/2015 |
| KR | 10-2010-0100459 A | 9/2010 |
| KR | 10-2010-0101963 A | 9/2010 |
| KR | 10-2011-0101683 A | 9/2011 |
| KR | 10-2011-0123138 A | 11/2011 |
| WO | WO 2013/022431 | 2/2013 |

OTHER PUBLICATIONS

International Search Report and Written Opinion dated Jul. 14, 2014 issued in Application No. PCT/KR2014/000185 (Full English Text).
Chinese Office Action dated Dec. 5, 2017 issued in Application No. 201480003108.4 (with English Translation).
Chinese Notice of Allowance dated Nov. 27, 2018 issued in CN Application No. 201480003108.4.

* cited by examiner

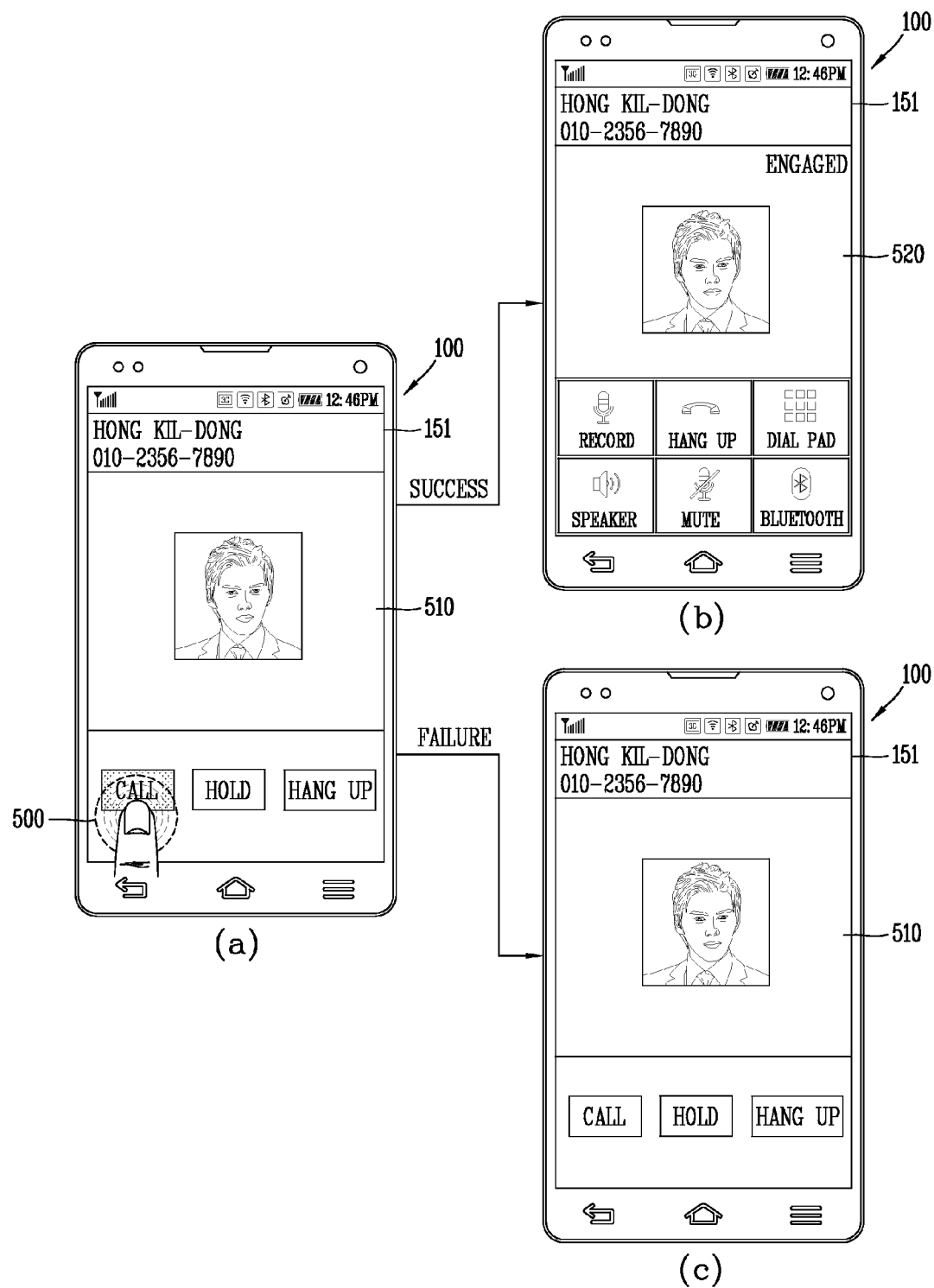

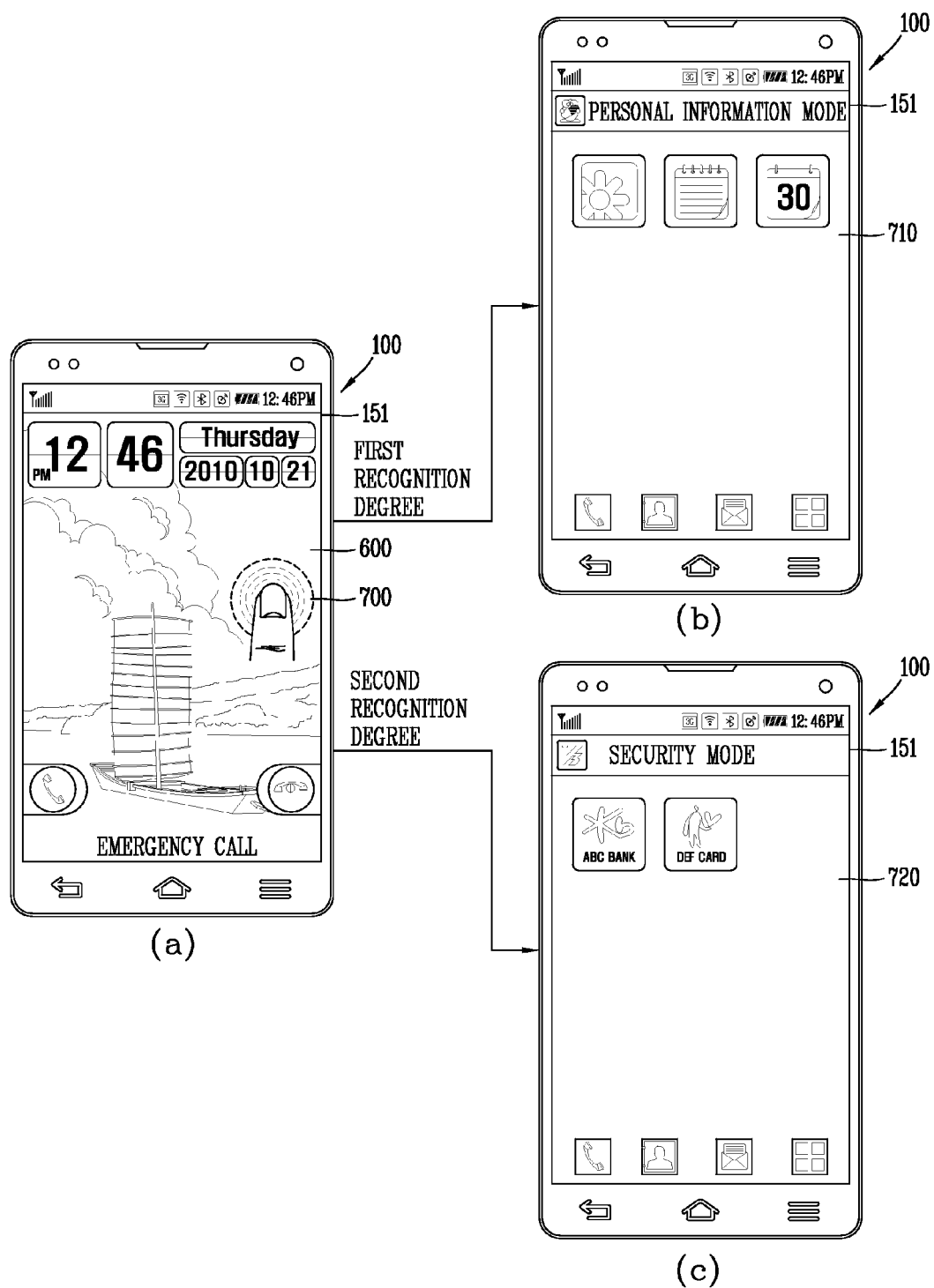

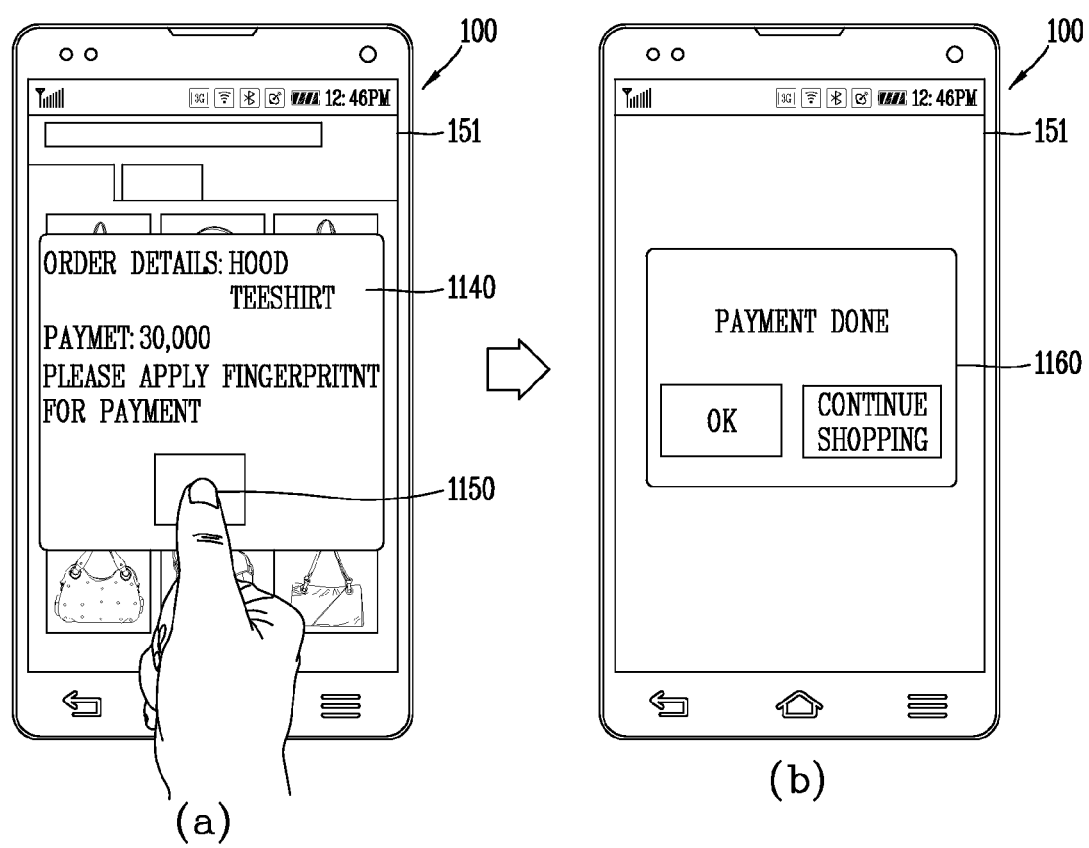

(a)      (b)

(c)

MOBILE TERMINAL AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2014/000185, filed Jan. 8, 2014, which claims priority to Korean Patent Application No. 10-2013-0124773, filed Oct. 18, 2013, whose entire disclosures are hereby incorporated by reference.

TECHNICAL FIELD

The present disclosure relates to a mobile terminal capable of sensing a touch and a fingerprint, and a control method thereof.

BACKGROUND ART

Terminals may be divided into a mobile terminal and stationary terminal according to whether or not terminals are movable. Also, mobile terminals may be divided into a handheld terminal and a vehicle mount terminal according to whether or not users can directly carry it around.

As functions become more diversified, mobile terminals may support more complicated functions such as capturing images or video, reproducing music or video files, playing games, receiving broadcast signals, and the like. By comprehensively and collectively implementing such functions, mobile terminals may be embodied in the form of multimedia player or devices.

In order to implement complicated functions of multimedia devices, various attempts have been made in terms of hardware or software. For example, a user interface environment allowing users to easily or conveniently search or select functions is provided.

Meanwhile, as sensors of display units of portable electronic devices, a sensor capable of sensing even a fingerprint of user's fingers, as well as a user's finger touch, has been developed. In line with this, the need for developing various user interfaces (UIs) using user fingers has been on the rise.

DISCLOSURE

Technical Problem

Therefore, an object of the present disclosure is to provide a mobile terminal capable of sensing a touch and a fingerprint and a control method thereof.

Technical Solution

According to an aspect of the present disclosure, there is provided a mobile terminal capable of performing a fingerprint recognition function, may include: a sensing unit configured to sense a fingerprint of a user's finger when the user's finger touches a display unit, in a state in which the fingerprint recognition function is executed; and a controller configured to determine whether to perform an operation related to an event that occurs in the mobile terminal on the basis of a degree of recognition of the sensed fingerprint.

In an exemplary embodiment of the present disclosure, the degree of fingerprint recognition is compared with a previously stored fingerprint to determine whether it is identical with the previously stored fingerprint, and the controller may differently set degrees of fingerprint recognition according to types of event that occur in the mobile terminal.

In an exemplary embodiment of the present disclosure, when the event that occurs in the mobile terminal is a first type of event and the degree of fingerprint recognition corresponds to a first recognition degree, the controller may perform an operation related to the first type of event, and when the generated event is a second type of event different from the first type of event and the degree of fingerprint recognition corresponds to a second recognition degree having a recognition rate higher than the first recognition degree, the controller may perform an operation related to the second type of event.

In an exemplary embodiment of the present disclosure, when the first type of event is an event for receiving a message from a particular person and the degree of recognizing the sensed fingerprint of the user's finger corresponds to the first recognition degree, the controller may output contents of the message to the display unit.

In an exemplary embodiment of the present disclosure, when the second type of event is an event related to payment and the degree of fingerprint recognition corresponds to the second recognition degree, the controller may execute an operation related to the payment.

In an exemplary embodiment of the present disclosure, when the fingerprint recognition fails, the controller may limit performing of an operation due to be performed when the fingerprint was recognized.

In an exemplary embodiment of the present disclosure, when a state of the mobile terminal meets a pre-set operating condition, the controller may execute the fingerprint recognition function such that whether to perform a function related to the event that occurs in the mobile terminal is determined according to a degree of fingerprint recognition.

In an exemplary embodiment of the present disclosure, the pre-set operating condition may be at least one of a particular position and a particular time slot.

In an exemplary embodiment of the present disclosure, when the mobile terminal is in a locked state, a lock screen that limits a user control command is output to the display unit, and when a user's finger touches the display unit, the controller may release the locked state on the basis of recognition of a fingerprint of the user's finger, and after the locked state is released, the controller may enter any one of a privacy mode and a security mode in which functions that the user may access are different according to a degree of recognition of the fingerprint.

In an exemplary embodiment of the present disclosure, when the degree of fingerprint recognition is equal to or higher than the first recognition degree, the controller may enter the privacy mode in which a function related to personal information is accessed, and when the degree of fingerprint recognition is equal to or higher than the second recognition degree having a recognition rate higher than that of the first recognition degree, the controller may enter the security mode in which a function related to payment is accessed.

In an exemplary embodiment of the present disclosure, when recognition of the fingerprint of the user's finger fails, the controller may enter a guest mode in which a basic function is accessed.

In an exemplary embodiment of the present disclosure, a graphic object indicating that the fingerprint recognition function is being executed may be output to a region of the display unit.

In an exemplary embodiment of the present disclosure, the graphic object may be output to a region of the display unit, and the controller may execute a function corresponding to the region to which the graphic object is output, on the basis of recognition of a fingerprint sensed in the region to which the graphic object is output.

In an exemplary embodiment of the present disclosure, any one of a plurality of home screen pages may be output to the display unit, and when a fingerprint of the user's finger is recognized as the user's finger touches a region of the display unit, the controller additionally outputs a home screen page which is not included in the plurality of home screen pages and which has not been output before the fingerprint recognition.

In an exemplary embodiment of the present disclosure, the user's finger touch may be applied to an empty region of the display unit to which a graphic object is not output.

In an exemplary embodiment of the present disclosure, the generated event may be an event for executing a camera application, and when a fingerprint of the user's finger is recognized in a particular region of the display unit while the camera application is being executed, the controller may control an image input through the camera to obtain an image corresponding to a pre-set value through the camera.

In an exemplary embodiment of the present disclosure, the mobile terminal may further include a storage unit having a plurality of fingerprint information, and the plurality of fingerprint information may be matched to different functions, and when any one of the plurality of fingerprint information is sensed, the controller may execute a function matched to the any one fingerprint information.

According to an aspect of the present disclosure, there is also provided a control method of a mobile terminal in which a fingerprint recognition function is executed, including: detecting an event generated in the mobile terminal; when a user's finger touches a display unit in a state in which the fingerprint recognition function is executed, sensing a fingerprint of the user's finger; and determining whether to perform an operation related to the event according to a degree of the fingerprint recognition.

In an exemplary embodiment of the present disclosure, the degree of fingerprint recognition may be set to be different according to types of event that occur in the mobile terminal.

In an exemplary embodiment of the present disclosure, when the event is a first type of event and the degree of fingerprint recognition corresponds to a first recognition degree, an operation related to the first type of event may be performed, and when the event is a second type of event and the degree of fingerprint recognition corresponds to a second recognition degree having a recognition rate higher than that of the first recognition degree, an operation related to the second type of event may be performed.

Advantageous Effects

According to exemplary embodiments of the present disclosure, whether to operate a mobile terminal may be determined according to a degree of fingerprint recognition by a user. Thus, the user may prevent someone else, other than himself or herself, from using his or her mobile terminal. In addition, by adjusting a degree of fingerprint recognition, a function used to quickly recognize a fingerprint and a function used to slowly recognize a fingerprint may be discriminated.

In addition, since different modes are entered according to a degree of fingerprint recognition in a locked state, security of a mobile terminal may be strengthened.

DESCRIPTION OF DRAWINGS

FIGS. 5A, 5B, and 5C are conceptual views illustrating the control method of FIG. 4.

FIGS. 7A and 7B are conceptual views illustrating a method for entering different modes according to a degree of fingerprint recognition.

FIGS. 11A and 11B are conceptual views illustrating a method for using different fingerprints in each event that occurs in the mobile terminal.

BEST MODES

Description will now be given in detail of the exemplary embodiments, with reference to the accompanying drawings. For the sake of brief description with reference to the drawings, the same or equivalent components will be provided with the same reference numbers, and description thereof will not be repeated. In the following description, suffixes "module" and "unit or portion" for components used herein in description are merely provided only for facilitation of preparing this specification, and thus they are not granted a specific meaning or function. In the following description, detailed explanation of known related functions and constitutions may be omitted to avoid unnecessarily obscuring the subject manner of the invention. The accompanying drawings are merely provided for illustrative purposes and should not be interpreted to limit the scope of the claims.

Mobile terminals described in this specification may include a cellular phone, smart phone, a laptop computer, a terminal for digital broadcast, a personal digital assistant (PDA), a portable multimedia player (PMP), a navigator, a slate PC, a tablet PC, an ultra book, etc. However, it can be readily understood by those skilled in the art that configurations according to exemplary embodiments described in this specification may be applied to stationary terminals such as a digital TV and a desktop computer, except a case in which the configurations are applicable to only the mobile terminals.

Figure 1:
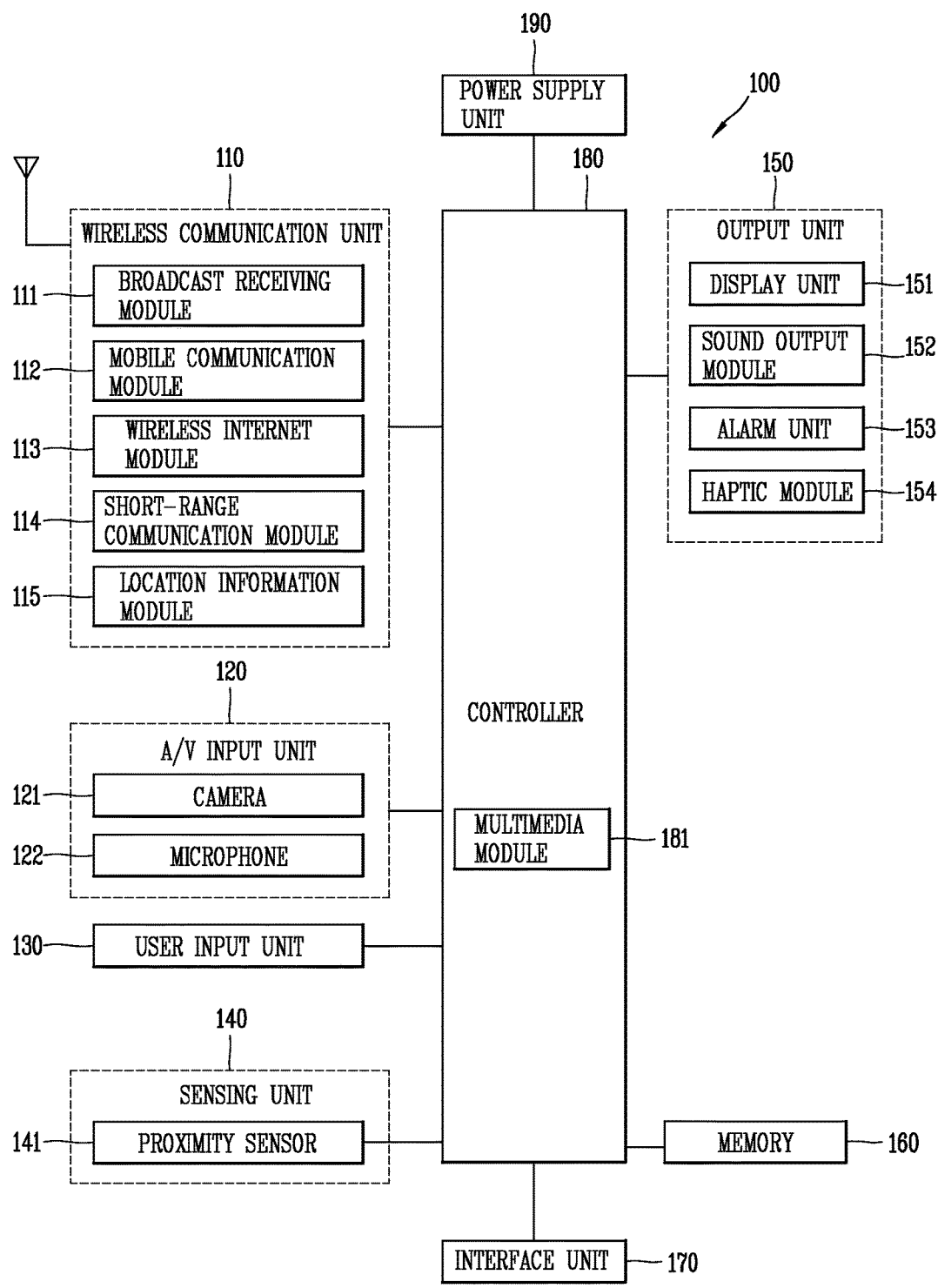
FIG. 1 is a block diagram of a mobile terminal disclosed in the present disclosure.

FIG. 1 is a block diagram of a mobile terminal according to an exemplary embodiment of the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location of the mobile terminal. A typical example of the location information module is a GPS (Global Positioning System).

Referring to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI.

The display unit 151 may include at least one of a liquid crystal display (LCD), a thin film transistor-LCD (TFT-LCD), an organic light emitting diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired exemplary embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a locked state in which a user input of a control command with respect to applications is limited when a state of the mobile terminal meets pre-set conditions. Also, in the locked state, the controller 180 may control a lock screen displayed in the locked state on the basis of a touch input sensed by the display unit 151 (hereinafter, referred to as a 'touch screen').

The power supply unit 190 receives external power or internal power and supplies appropriate power required for operating respective elements and components under the control of the controller 180.

Various exemplary embodiments described herein may be implemented in a computer-readable or its similar medium using, for example, software, hardware, or any combination thereof.

For hardware implementation, the exemplary embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such exemplary embodiments may be implemented by the controller 180 itself.

For software implementation, the exemplary embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The mobile terminal according to an exemplary embodiment of the present disclosure described above with reference to FIG. 1, the mobile terminal in which components of the mobile terminal are disposed, or the structure of the mobile terminal will be described.

Figure 2A:
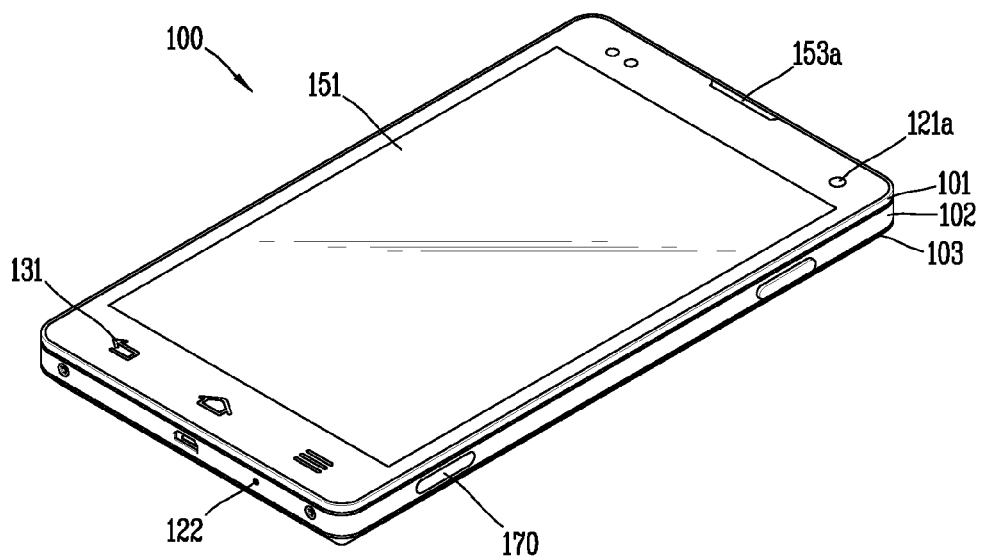
FIG. 2A is a front perspective view of the mobile terminal according to an exemplary embodiment of the present disclosure.
Figure 2B:
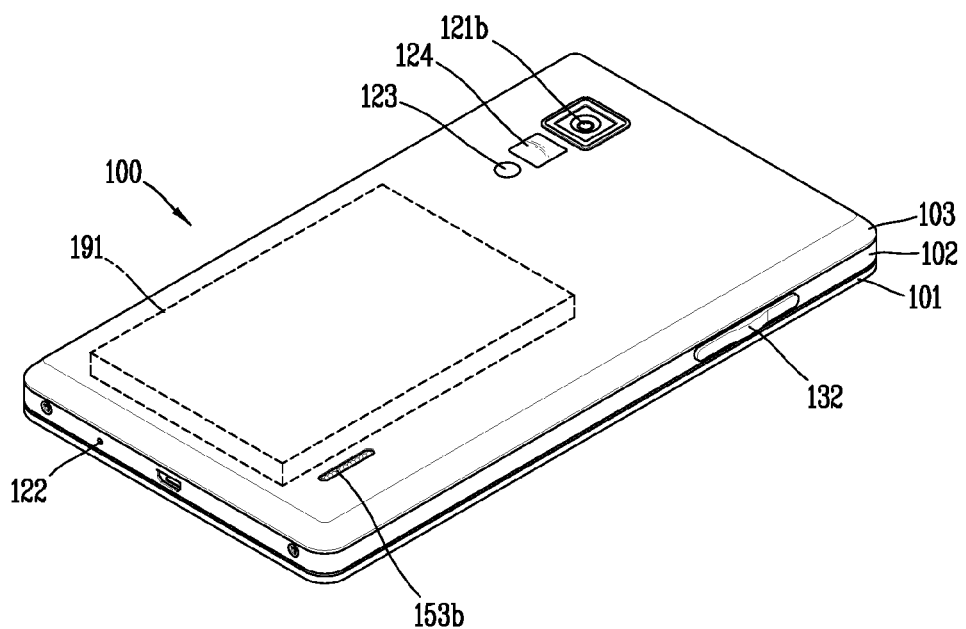
FIG. 2B is a rear perspective view of the mobile terminal according to an exemplary embodiment of the present disclosure.

FIG. 2A is a front perspective view of the mobile terminal according to an exemplary embodiment of the present disclosure, and FIG. 2B is a rear perspective view of the mobile terminal illustrated in FIG. 2A.

The disclosed mobile terminal has a bar type terminal body. However, the present disclosure is not limited thereto and may be applicable to various structures such as a slide type mobile terminal, a folder type mobile terminal, a swing type mobile terminal, a swivel type mobile terminal, etc, in which two or more bodies are combined to be relatively movable.

As illustrated, the terminal body 100 (referred to as 'body', hereinafter) includes a front surface, a lateral surface, and a rear surface. Also, the body includes both ends formed in a length direction.

The body includes a case (or casing, housing, cover, etc.) constituting the external appearance. In this exemplary embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130/131, 132, the microphone 122, the interface unit 170, etc. may be disposed mainly on the front case 101 of the terminal body 100.

The display unit 151 occupies the most of a main surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102. The microphone 122 may be disposed on the other end of the body 100.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Contents inputted by the first and second manipulation units 131 and 132 can be variably set. For example, the first manipulation unit 131 may receive a command such as starting, ending, scrolling, etc., and the second manipulation unit 132 may receive a command such as controlling of the size of a sound outputted from the audio output unit 152 or conversion into a touch recognition mode of the display unit 151.

Referring to FIG. 2B, an audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

A camera 121' may additionally be disposed on the rear case 102 of the terminal body. The camera 121' may have an image capture direction which is substantially opposite to that of the camera 121 (See FIG. 2a), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output unit 252' may be additionally disposed on the rear surface of the terminal body. The audio output unit 252' may implement a stereoscopic function along with the audio output module 22 (See FIG. 2A), and may be used for implementing a speaker phone mode during call communication.

A power supply unit 190 for supplying power to the mobile terminal 100 may be installed on the terminal body. The power supply unit 190 may be installed in the terminal body or may be directly detached from the outside of the terminal body.

Also, the mobile terminal according to an exemplary embodiment of the present disclosure that may include one or more of the components as described above may determine whether to operate a mobile terminal by using a user's fingerprint applied to the display unit 151.

Figure 3:
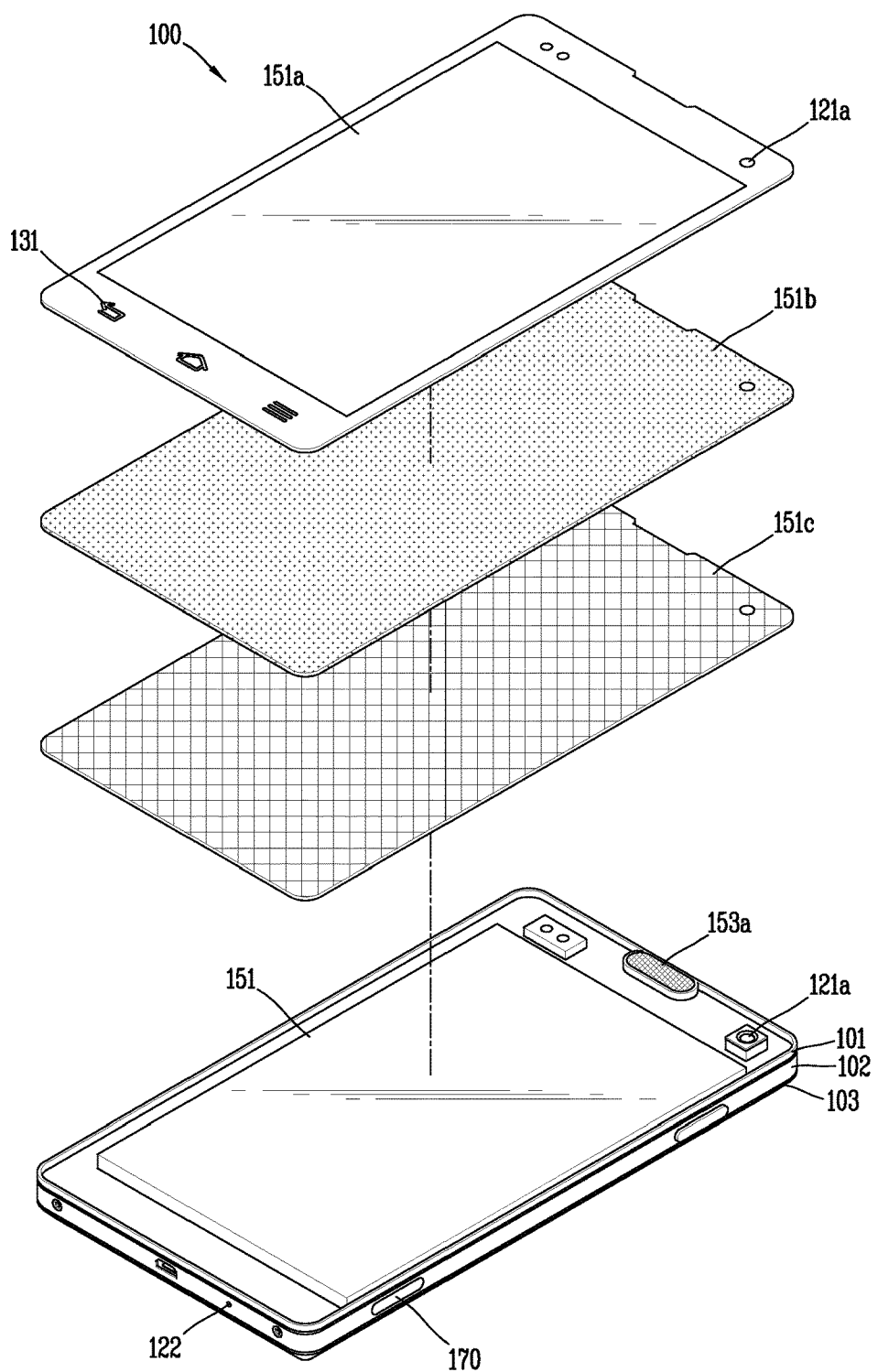
FIG. 3 is a conceptual view illustrating a structure of a display unit including a fingerprint recognition sensor in the mobile terminal according to an exemplary embodiment of the present disclosure.

Hereinafter, exemplary embodiments of the present disclosure will be described in detail. FIG. 3 is a conceptual view illustrating a structure of the display unit 151 capable of recognizing a fingerprint in the mobile terminal according to an exemplary embodiment of the present disclosure.

Referring to FIG. 3, in the display unit 151, a glass substrate 151a, a touch sensor 151b sensing a touch, and a fingerprint recognition sensor 151c for recognizing a fingerprint may be overlaid in a layered manner. In this case, as illustrated in FIG. 3, the touch sensor 151b may be positioned below the glass substrate 151, and the fingerprint recognition sensor 151c may be positioned below the touch sensor 151b. Also, the positions of the touch sensor 151b and the fingerprint recognition sensor 151c may be interchanged. For example, the fingerprint recognition sensor 151c may be optical sensors.

As described above with reference to FIG. 1, the touch sensor 151b may sense a touch input applied to the display unit 151. Also, the glass substrate 151a may be light-transmissive and show screen information output to the display unit 151 to the user.

In addition, when the fingerprint recognition sensor is an optical sensor, for example, resolution of the terminal may be adjusted by adjusting an amount of light by means of the fingerprint recognition sensor 151c. For example, when the fingerprint recognition sensor 151c is controlled to allow a large amount of light to be transmitted, the display unit 151 may have high resolution. Conversely, in a case in which the fingerprint recognition sensor 151c provides control to allow a small amount of light to be transmitted, the display unit 151 may have low resolution.

The controller 180 may control a degree of fingerprint recognition of a user's finger applied to the display unit 151 by adjusting resolution by using the fingerprint recognition sensor 151c. For example, in order to enhance a fingerprint recognition rate, the controller 180 may adjust the display unit 151 to have high resolution.

In this case, when the display unit 151 has high resolution, clarity (sharpness) of a fingerprint image may be increased. Also, when the display unit 151 has low resolution, clarity (sharpness) of a fingerprint image may be decreased. In this case, the fingerprint recognition rate may be determined according to thickness of lines of the fingerprint. For example, when lines constituting the fingerprint are thick, the fingerprint recognition rate may be high, while when lines constituting the fingerprint are thin, the fingerprint recognition rate may be low In the above, the display unit 151 as an input unit has been described. Having the touch sensor 151b and the fingerprint recognition sensor 151c, the display unit 151 may be able to recognize a touch input and fingerprint. Hereinafter, a method for controlling an operation of a mobile terminal through touch and fingerprint recognition will be described.

Figure 4:
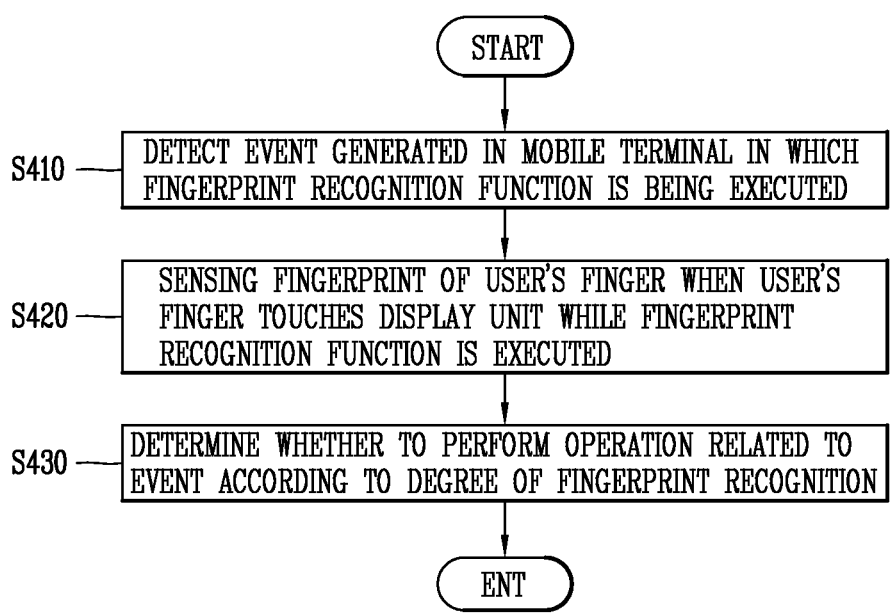
FIG. 4 is a flow chart illustrating a control method for determining whether to operate the mobile terminal on the basis of a degree of fingerprint in the mobile terminal according to an exemplary embodiment of the present disclosure.
Figure 5B:
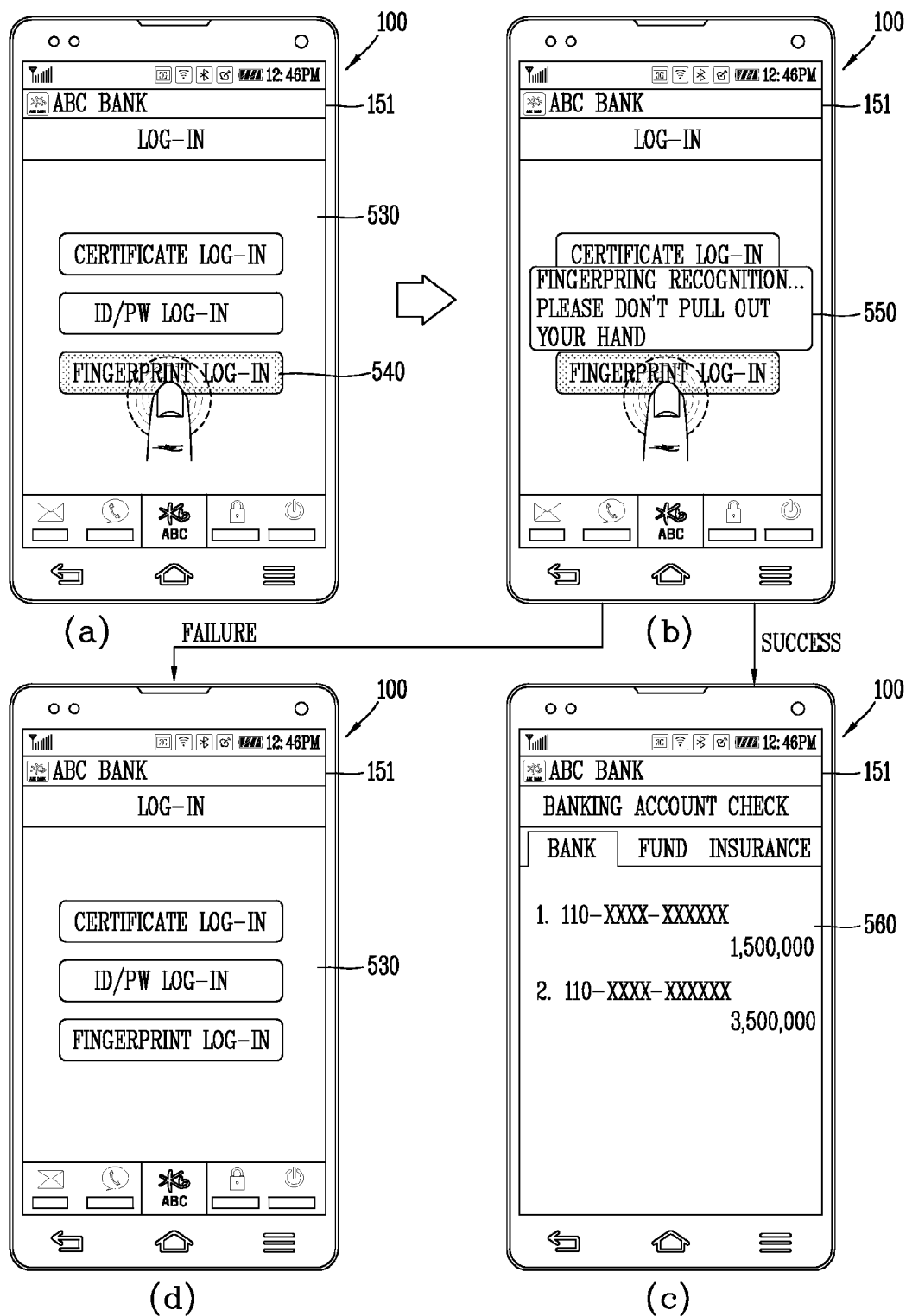

FIG. 4 is a flow chart illustrating a method for controlling a mobile terminal on the basis of a degree of fingerprint recognition in the mobile terminal available for fingerprint recognition, and FIGS. 5A and 5B are conceptual views illustrating the control method of FIG. 4.

An event may occur in the mobile terminal according to an exemplary embodiment of the present disclosure (S410).

The event may include various events that may occur in the mobile terminal, such as a call event received from an external device, a message reception event, an application execution event, an event for logging in a certain application, an event for releasing a locked state as a limited state of a control command of the mobile terminal, and the like.

After the event occurs, when a user's finger touch is applied to the display unit in a state in which a fingerprint recognition function is executed, a fingerprint of the user's finger is sensed in the mobile terminal according to an exemplary embodiment of the present disclosure (S420).

Fingerprint recognition, one of biometrics, uses the characteristics that fingerprints formed in the inner skin are unique for each person. For fingerprint recognition, the user may register his or her fingerprint. Thereafter, the controller 180 may determine whether the registered fingerprint and a recognized fingerprint are identical. For example, whether the registered fingerprint and the recognized fingerprint are identical may be determined according to whether features of the registered fingerprint and the recognized fingerprint are identical by more than a pre-set level.

In order to recognize the fingerprint, as described above with reference to FIG. 3, the display unit 151 may sense a fingerprint of the user's finger applied to the display unit 151 by using the fingerprint recognition sensor 151c.

The controller 180 may adjust resolution of the display unit 151 by adjusting an amount of light generated in the fingerprint recognition sensor 151c. For example, when an amount of light generated in the fingerprint recognition sensor 151c is increased by the controller 180, resolution of the display unit 151 may be increased. Also, when an amount of light generated in the fingerprint recognition sensor 151c is decreased by the controller 180, resolution of the display unit 151 may be decreased.

The controller 180 may control a degree of fingerprint recognition by using resolution of the display unit 151. For example, when the display unit 151 has high resolution, fingerprint recognition may have a high recognition rate. Conversely, when the display unit 151 has low resolution, fingerprint recognition may have a low recognition rate.

After the fingerprint is recognized, whether to perform an operation related to the event generated in the mobile terminal according to an exemplary embodiment of the present disclosure may be determined on the basis of the sensed degree of fingerprint recognition (S430).

The operation related to the event may be an operation that may be performed when the event occurs. For example, in a case in which the event is a call event, the operation related to the call event may be at least one operation among call acceptance, call rejection, and call holding. In another example, in a case in which the event is an event for releasing a locked state, the operation related to the event may be an operation to release the locked state and enter a home screen.

The controller 180 may determine whether to perform the operation related to the generated event on the basis of the degree of fingerprint recognition recognized by the display unit 151.

The degree of fingerprint recognition may be a recognition rate of the fingerprint. In this case, degrees of fingerprint recognition may be set to be different according to types of events. In this case, degrees of fingerprint recognition according to types of events may be set according to a user selection or may be set in advance. For example, in a case in which the event is a call event with respect to a particular person or an event related to payment, a degree of fingerprint recognition corresponding to the event with respect to the particular person may be lower than a degree of fingerprint recognition corresponding to an event related to payment.

When the degree of fingerprint is equal to or higher than a recognition rate previously matched to the generated event, the controller 180 may perform an operation related to the generated event. In detail, in a case in which a type of the generated event is a first type of event, when the degree of fingerprint recognition corresponds to a first recognition degree, the controller may perform an operation related to the first type of event, and in a case in which a type of the generated event is a second type of event, when the degree of fingerprint recognition corresponds to a second recognition degree having a recognition rate higher than that of the first recognition degree, the controller may perform an operation related to the second type of event. For example, since the second type of event has a degree of fingerprint recognition higher than that of the first type of event, it may be an event related to payment, security, and the like.

In an exemplary embodiment, in a case in which the first type of event is an event for receiving a message with respect to a particular person, when the degree of fingerprint recognition corresponds to a first recognition degree, an operation (e.g., checking message contents) related to the message reception event may be performed.

Meanwhile, although an event occurs, if the fingerprint recognition fails, the controller 180 may limit performing of an operation related to the event. In this case, fingerprint recognition may fail when the fingerprint recognition does not meet a degree of fingerprint recognition required for performing an operation related to the event or when the fingerprint is not identical to a previously stored fingerprint.

Since performing of an operation related to the event is limited, outputting of screen information, which is currently output, to the display unit 151 may be maintained. For example, an operation related to the event may not be performed and screen information output to the display unit 151 when the event occurred may be continuously output.

Also, a graphic object indicating failure of the fingerprint may be output to a region of the display unit 151. For example, when fingerprint recognition fails, a pop-up window indicating the failure of fingerprint recognition may be output to the center of the display unit 151.

In an exemplary embodiment, referring to (a) of FIG. 5A, a call event 610 from a particular person may be received by the mobile terminal 100. In this case, the user may apply his finger touch to a call button output to the display unit 151 in order to receive the call from the particular person.

When the touch is applied, the sensing unit 140 may sense a fingerprint 500 of the user's finger. As the fingerprint of the user's finger is sensed by the sensing unit 140, the controller 180 may determine a degree by which the sensed fingerprint is identical to a previously stored fingerprint. In this case, the degree by which the sensed finger print is identical to the previously stored fingerprint may be a fingerprint recognition degree.

When the fingerprint recognition is successful, the controller 180 may perform an operation related to the event. For example, referring to (b) of FIG. 5A, when the fingerprint recognition is successful, the controller 180 may perform call communication. Also, in this case, a screen 520 according to performing of the operation may be output to the display unit 151.

Meanwhile, when the fingerprint recognition fails, the controller 180 may limit performing of the operation related to the event. For example, referring to (c) of FIG. 5A, when the fingerprint recognition fails, the controller 180 may limit performing of a call. In this case, the screen 510 currently output to the display unit 151 may be maintained as is. Also, although not shown, when the fingerprint recognition fails, a graphic object indicating the failure of the fingerprint recognition may be output to a region of the display unit 151.

In another example, referring to (a) of FIG. 5B, a bank application 530 may be executed in the mobile terminal. In case of the bank application, a method for maintaining security by an application related to security may be important. Thus, a degree of fingerprint recognition may be higher than that of any other r applications. For example, a degree of fingerprint recognition for performing an operation related to the bank application may be higher than that of fingerprint recognition for performing an operation related to the call event.

In an exemplary embodiment, as illustrated in (a) of FIG. 5B, while the bank application is being executed, the user may perform fingerprint recognition in order to log-into (540) the bank application. In this case, a degree of fingerprint recognition for logging into the bank application may require a high recognition rate. In the case in which the high recognition rate is required, it may take a long period of time for fingerprint recognition by the controller 180. Thus, as illustrated in (b) of FIG. 5B, a pop-up window 550 indicating the execution of fingerprint recognition may be output. Accordingly, the controller 180 may allow the user to maintain his or her touch on the display unit 151 until when fingerprint recognition is terminated.

When the degree of fingerprint recognition is satisfied, the controller 180 may execute an operation related to the event. For example, as illustrated in (c) of FIG. 5B, when the fingerprint recognition is successful, the user may log-into the bank application. In this case, various functions 560 that may be executed in the bank application may be output to the display unit 151.

Meanwhile, when the fingerprint recognition fails, the controller 180 may limit performing of the operation related to the event. For example, as illustrated in (d) of FIG. 5B, the controller 180 may limit logging into the bank application. In this case, the screen information 530, being currently output, may be continuously output to the display unit 151.

Figure 5C:
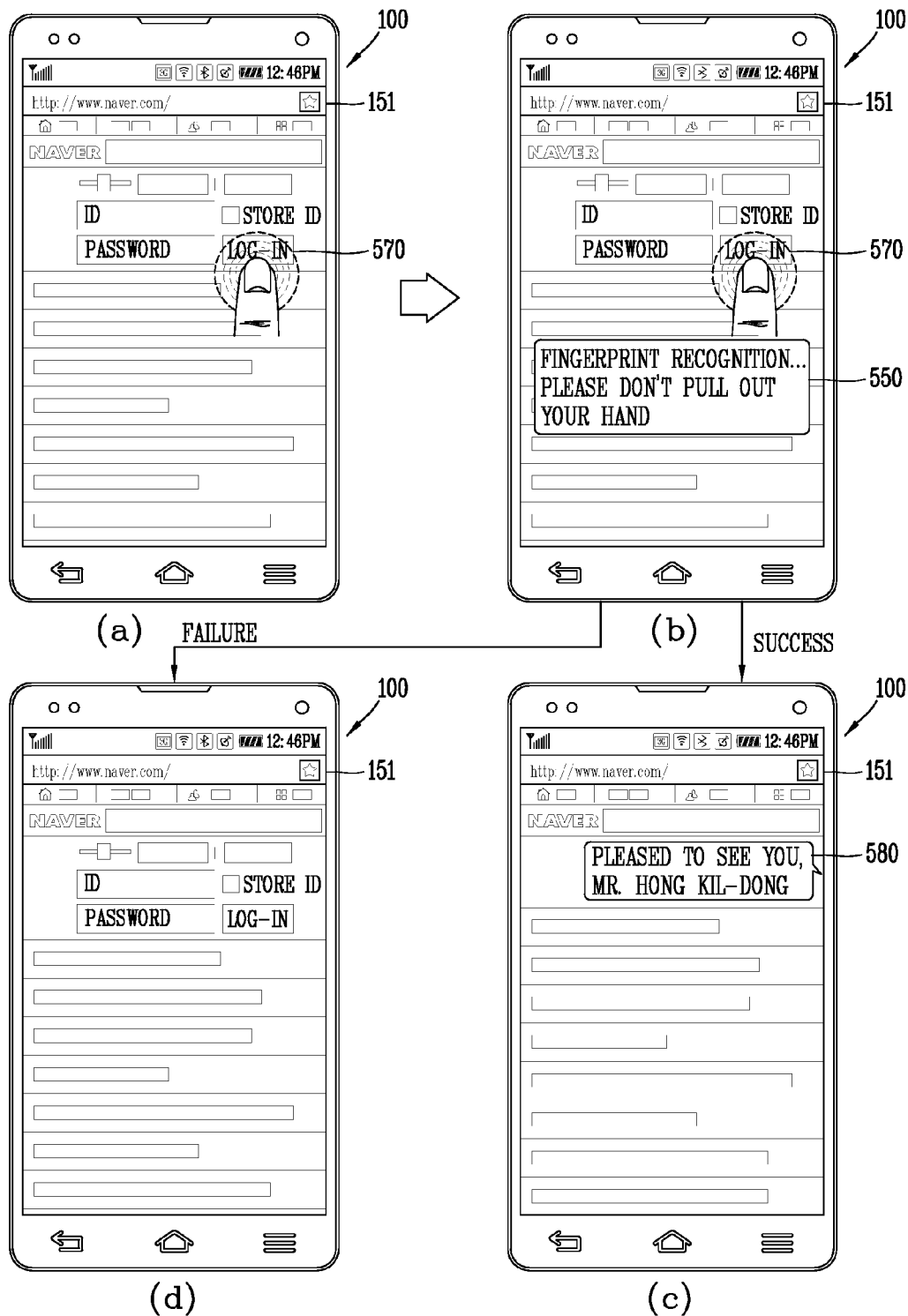

In another example, an event requiring a high degree of fingerprint recognition may include an event for logging in a Web page. For example, as illustrated in (a) of FIG. 5C, a Web page may be output to the display unit 151. In the state in which the Web page is output, the user may apply a touch input 570 for fingerprint recognition to a region of the display unit 151. For example, the region of the display unit 151 may be a region in which a graphic object related to log-in is output.

In this case, the log-in operation may require a high degree of fingerprint recognition for an operation related to security of personal information. The high degree of fingerprint recognition may require a longer period of time for fingerprint recognition. In order to inform the user about this, the controller 180 may output notification information indicating that fingerprint recognition is being performed, to the display unit 151. For example, as illustrated in (b) of FIG. 5C, the controller 180 may output the pop-up window 550 indicating that fingerprint recognition is being performed, to a region of the display unit 151.

When the fingerprint recognition is successful, the controller 180 may perform a log-in operation as illustrated in (b) and (c) of FIG. 5B. Meanwhile, when the fingerprint recognition fails, the controller 180 may not perform the log-in operation as illustrated in (d) of FIG. 5B. In this case, the screen information, which is currently being output, may be output as is to the display unit 151. For example, the controller 180 may output the screen information which has been output before logging in, as is.

In the above, the method for determining whether to perform an operation related to an event that occurs in the mobile terminal on the basis of a degree of fingerprint recognition has been described. In this manner, only the user may perform an operation related to an event that occurs in the mobile terminal. Also, by differing degrees of fingerprint recognition according to types of event, an event that does not require a high recognition rate may be quickly controlled.

Figure 6A:
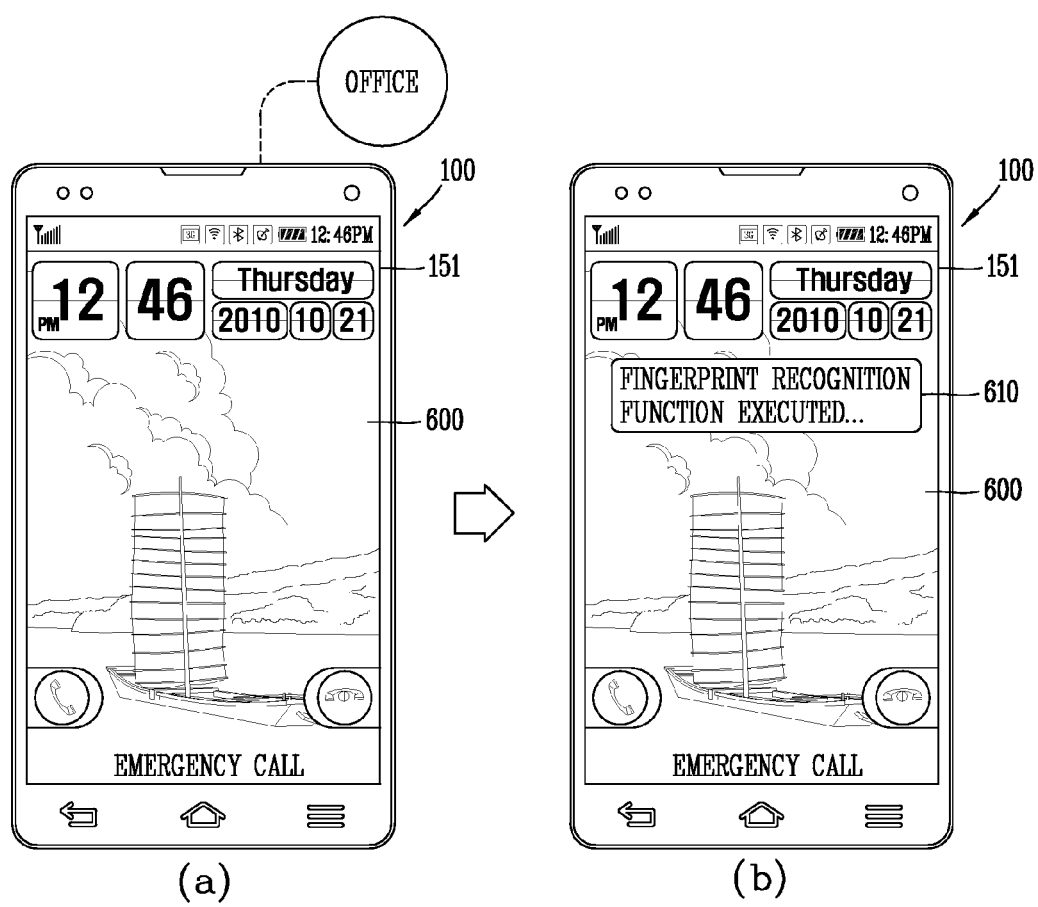
FIGS. 6A and 6B are conceptual views illustrating a case in which a fingerprint recognition function is automatically executed.
Figure 6B:
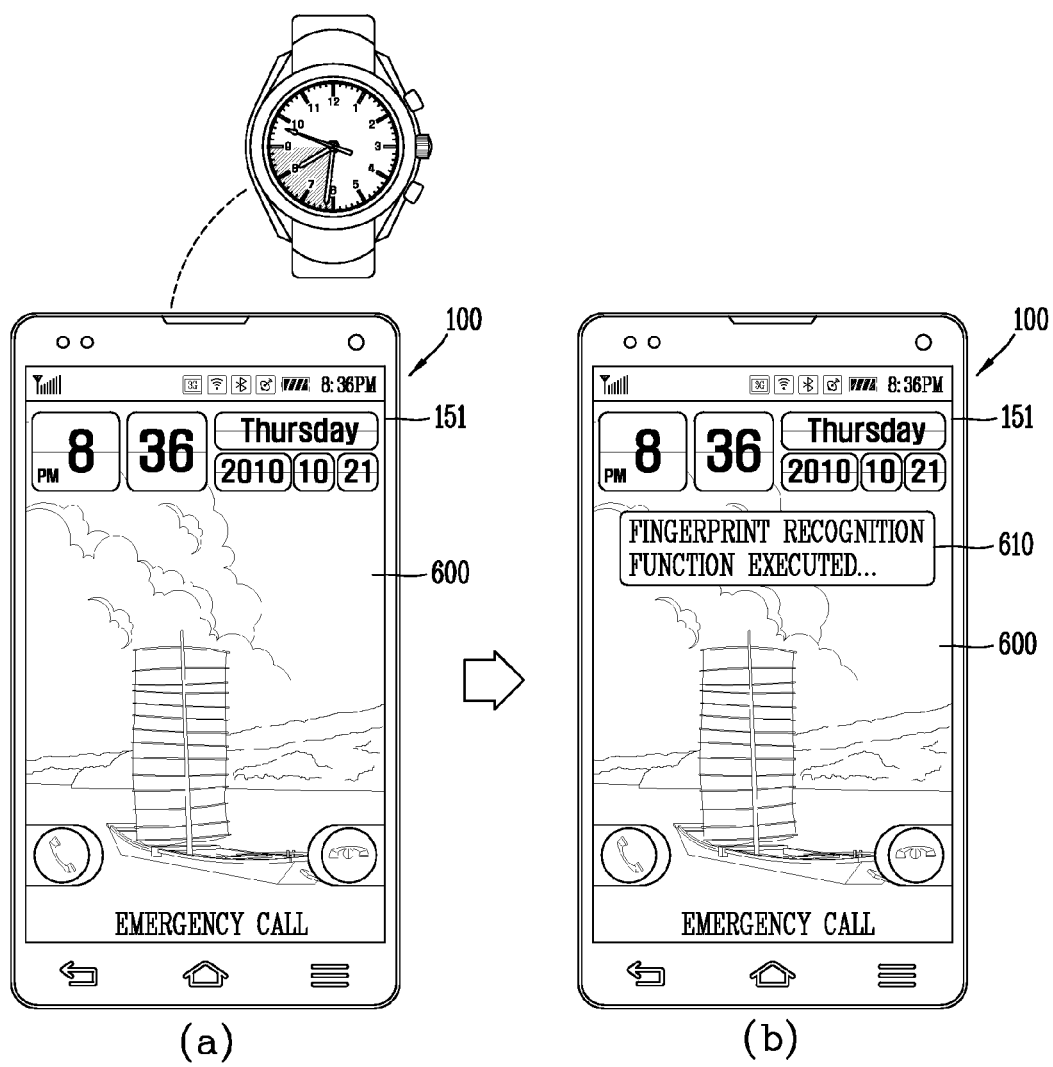

Hereinafter, a case in which the fingerprint recognition function is executed when a pre-set condition are met will be described. FIGS. 6A and 6B are conceptual views illustrating execution of the fingerprint recognition function when a state of the mobile terminal satisfies a pre-set operation.

When the pre-set condition is met, the mobile terminal according to an exemplary embodiment of the present disclosure may execute the fingerprint recognition function. For example, the pre-set condition may be at least one of a particular location, an occurrence of an event related to a particular person, execution of a particular application, and a particular time slot.

When the fingerprint recognition function is executed, every event may occur through fingerprint recognition in the mobile terminal. For example, in a case in which the mobile terminal is in a locked state, the locked state may be released on the basis of a degree of fingerprint recognition.

In an exemplary embodiment, as illustrated in (a) of FIG. 6A, in a case in which the mobile terminal is in a locked state, a lock screen 600 that limits a user's control command may output to the display unit 151.

In this case, the mobile terminal may further include a location information module 115 that receives location information. As illustrated above with reference to FIG. 1, a typical example of the location information module 115 may be a global positioning system (GPS).

The controller 180 may recognize a current location of the mobile terminal by using the location information module 115. For example, the controller 180 may recognize that the mobile terminal is currently located in a company by using the location information module 115.

In this case, when the location of the mobile terminal is a pre-set location, the controller 180 may execute the fingerprint recognition function. When the fingerprint recognition function is executed, the locked state may be released through the fingerprint recognition function. In this case, as illustrated in (b) of FIG. 6A, notification information 610 indicating that the fingerprint recognition function is being executed may be output to a region of the display unit 151.

In another example, as illustrated in (a) of FIG. 6B, when a particular time slot arrives, the mobile terminal in the locked state may execute the fingerprint recognition function. For example, the particular time slot may be from 6:00 p.m. to 9:00 p.m.

When the fingerprint recognition function is executed in the particular time slot, as illustrated in (b) of FIG. 6B, the notification information 610 indicating that the fingerprint recognition function is being executed, may be output to a region of the display unit 151.

Also, when the fingerprint recognition function is executed, the locked state of the mobile terminal may be released through fingerprint recognition.

In the above, the case in which the fingerprint recognition function is executed when a pre-set condition is met has been described. Since the fingerprint recognition function is executed only when the pre-set function is met, battery consumption due to execution of the fingerprint recognition function may be reduced. Also, since the fingerprint recognition function is automatically executed only when the pre-set condition is met, the fingerprint recognition function may be executed without a user's particular manipulation, increasing user convenience.

Figure 7B:
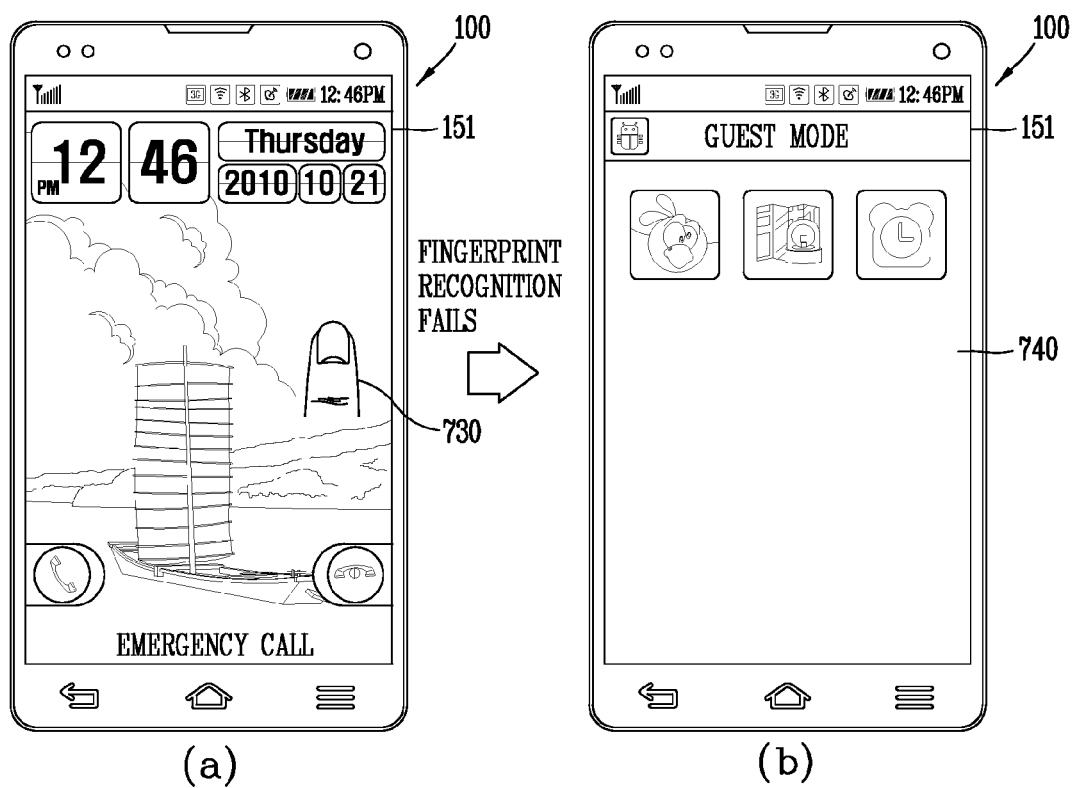

Hereinafter, a method for entering various modes having different functions that may be accessed by the user according to a degree of fingerprint recognition when a locked state is released by using fingerprint recognition will be described. FIGS. 7A and 7B are conceptual views illustrating entering various modes having different functions that may be accessed by the user according to a degree of fingerprint recognition.

When the mobile terminal is in a locked state, the controller 180 may release the locked state by using the fingerprint recognition function. In this case, the controller 180 may enter a different mode according to a degree 700 of the fingerprint recognition.

For example, the degree of fingerprint recognition may include a first recognition degree and a second recognition degree. In this case, when the degree of fingerprint recognition corresponds to the first recognition degree, the controller 180 may enter the first mode and when the degree of fingerprint recognition corresponds to the second recognition degree, the controller 180 may enter the second mode.

In an exemplary embodiment, referring to (a) of FIG. 7A, the mobile terminal may be in a locked state. In this case, the lock screen 600 that limits a user control command may be output to the display unit 151.

When a user finger's touch for releasing the lock screen 600 is applied to a region of the display unit 151, the controller 180 may recognize (700) a fingerprint of the user's finger. The region of the display unit 151 may be a certain region or may be a region in which a graphic object indicating a position at which the fingerprint is recognized is indicated is output.

When the fingerprint is recognized, the controller 180 may release the locked state. When the locked state is released, the controller 180 may enter any one of a privacy mode 710 and a security mode 720 in which the user may access different functions according to a degree of the fingerprint recognition.

For example, referring to (b) of FIG. 7A, when the fingerprint recognition corresponds to a first recognition degree, the controller 180 may enter the privacy mode (or a personal information mode) 710 in which a function related to personal information may be accessed. The privacy mode 710 may be a mode in which an application related to privacy of an individual, such as a gallery, a memo, a diary, and the like, may be accessed.

In another example, referring to (c) of FIG. 7A, when the fingerprint recognition corresponds to a second recognition degree, the controller 180 may enter the security mode 720 in which a function related to payment may be accessed. The security mode 720 may be a mode in which a security-important application, such as bank, card, and the like, may be accessed.

Meanwhile, when the fingerprint recognition fails (730), the controller 180 cannot enter the privacy mode and the security mode. In this case, the controller 180 may not release the locked state. In this case, the controller 180 may maintain the locked state as is.

Alternatively, referring to FIG. 7B, the controller 180 may release the locked state and enter a guest mode 740. In the guest mode 740, the application related to privacy of an individual and payment may not be accessed, but an application unrelated to privacy and payment may be accessed. For example, as illustrated in (b) of FIG. 7B, in the guest mode 740, an application unrelated to privacy of an individual and payment, such as a clock, a map, a game, and the like, may be accessed.

In the above, the case in which the controller 180 enters various modes in the locked according to a degree of fingerprint recognition has been described. Thus, the user may selectively enter a mode in which a simple function is executed without performing fingerprint recognition, a mode in which a function that requires fast fingerprint recognition is executed, and a mode in which a function that requires slow but accurate fingerprint recognition is executed. Also, since the modes are accessible only through fingerprint recognition, security of the mobile terminal may be further strengthened.

Figure 8A:
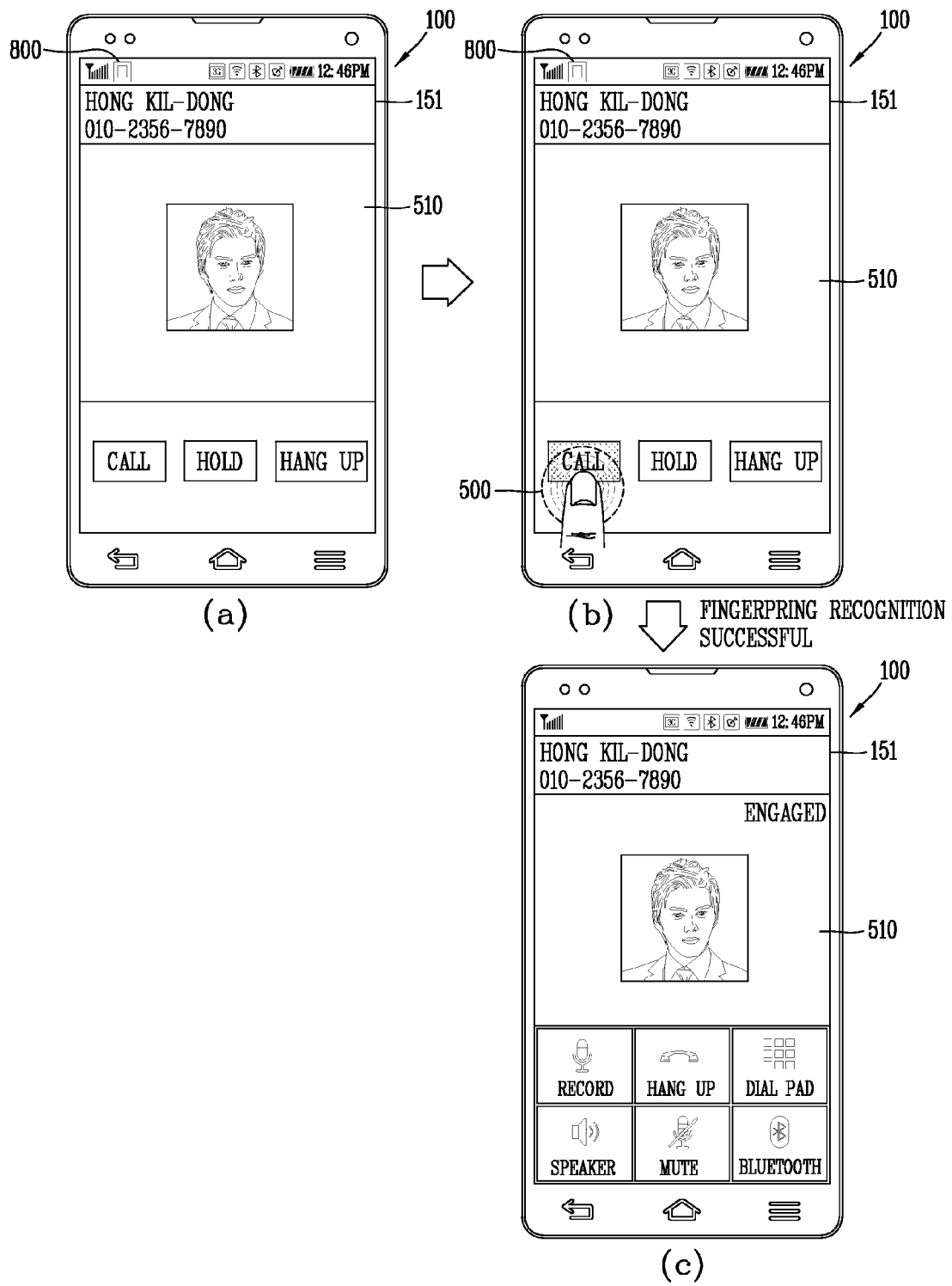
FIGS. 8A and 8B are conceptual views illustrating a method for outputting a graphic object indicating that the fingerprint recognition function is executed.
Figure 8B:
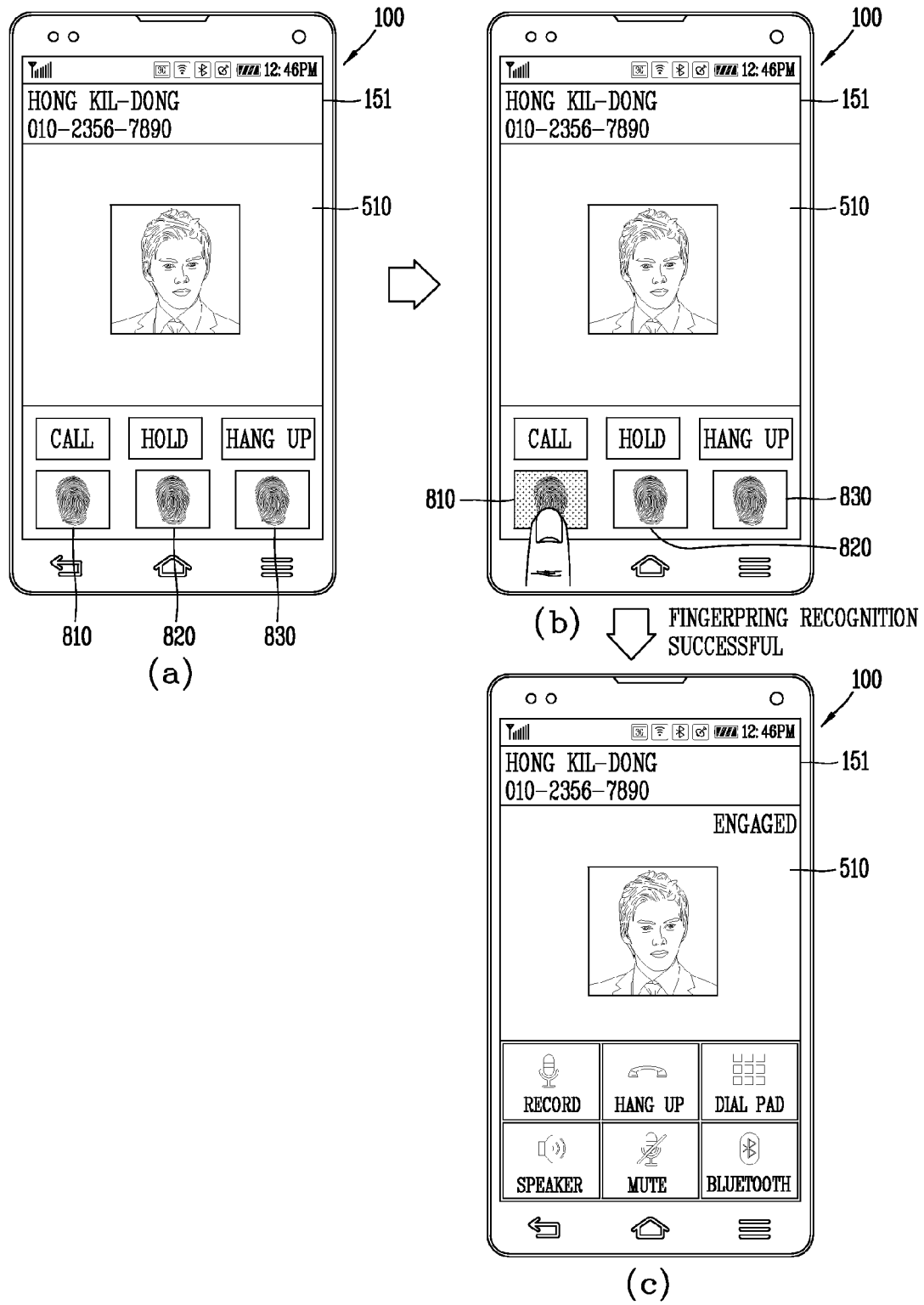

Hereinafter, a method for outputting a graphic object indicating that the fingerprint recognition function is executed will be described. FIGS. 8A and 8B are conceptual views illustrating various methods of outputting a graphic object indicating that the fingerprint recognition function is executed.

In order to indicate that the fingerprint recognition function is executed, the controller 180 may output a graphic object 800 indicating that the fingerprint recognition function is executed, to a region of the display unit 151.

The graphic object may have a color, shape, animation effect, or the like, which is varied according to any one of execution of the fingerprint recognition function, a success of the fingerprint recognition function, and a failure of the fingerprint recognition function. For example, the graphic object may have different colors for a case in which the fingerprint recognition function is successful and a case in which the fingerprint recognition function fails.

When the graphic object 800 is being output, the controller 180 may recognize the user's fingerprint applied to a region of the display unit 151.

For example, referring to (a) of FIG. 8A, a call event received from a particular person may be occur in the mobile terminal. In this case, the controller 180 may output the graphic object 800 indicating that the fingerprint recognition function is executed, in a status bar indicating a state of the display unit 151.

Referring to (b) of FIG. 8A, the controller 180 may recognize a user's fingerprint for performing an operation related to the call event. When the fingerprint recognition is successful, a call reception operation related to the call event may be executed as illustrated in (c) of FIG. 8A.

In this case, referring to (c) of FIG. 8A, when the call is terminated, the graphic object may disappear from the display unit 151. In this case, the controller 180 may not recognize a fingerprint applied to the display unit 151 any further.

In another example, as illustrated in (a) of FIG. 8B, when the fingerprint recognition function is executed, the controller 180 may output graphic objects 810, 820, and 830 indicating positions at which a fingerprint is to be recognized. For example, in (a) of FIG. 8B, the controller may output the graphic objects 810, 820, and 830 to regions below call, holing, and end buttons are output. In this case, the controller 180 may recognize a fingerprint only in the positions at which the graphic objects 810, 820, and 830 are output.

As illustrated in (b) of FIG. 8B, the user may place his or her finger to the position at which the graphic objects are output to allow his or her fingerprint to be recognized. In this case, the controller 180 may recognize the user's fingerprint. When the fingerprint recognition is successful, the user may perform call communication as illustrated in (c) of FIG. 8B.

In the above, various methods for outputting graphic objects indicating that the fingerprint recognition function is being executed have been described. In this manner, the user may execute an operation related to an event through the fingerprint recognition function. Also, the user may recognize a fingerprint recognition position for recognizing a fingerprint.

Figure 9:
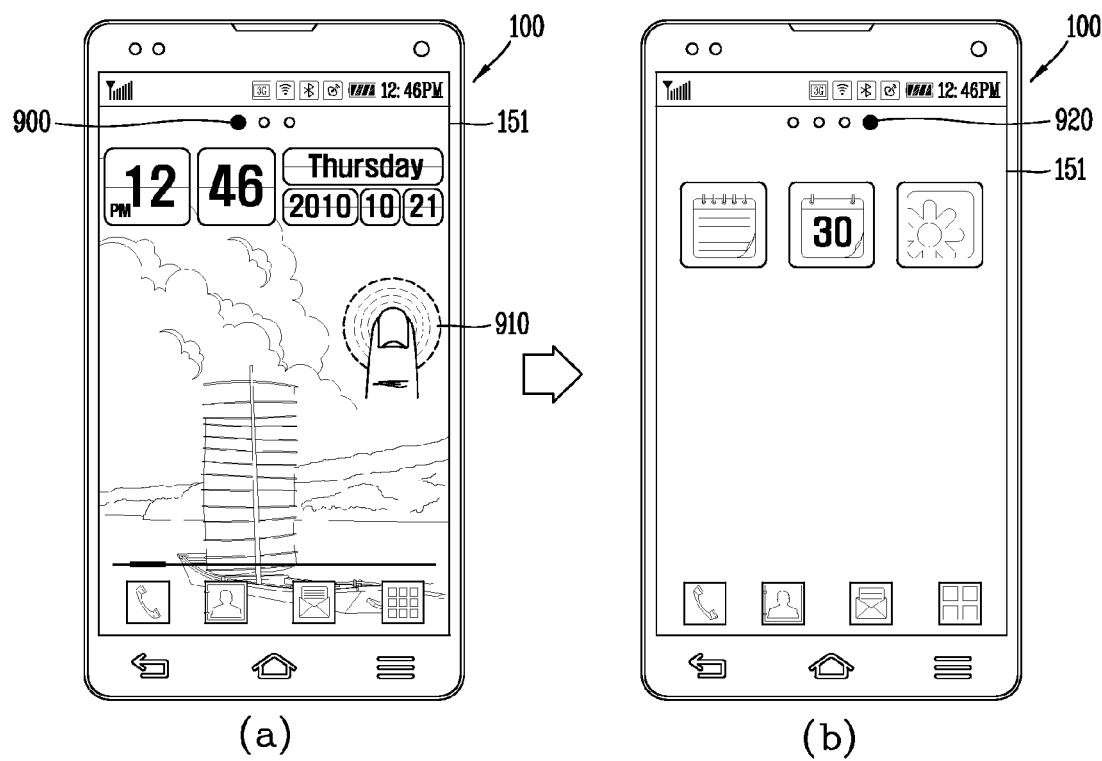
FIG. 9 is a conceptual view illustrating a method for utilizing the fingerprint recognition function when a camera application is being executed.

Hereinafter, various functions executed by using fingerprint recognition will be described. FIG. 9 is a conceptual view illustrating outputting a home screen page corresponding to a fingerprint on the basis of the fingerprint.

In a state in which any one home screen page 900, among a plurality of home screen pages, is output to the display unit 151, a fingerprint may be recognized in a region of the display unit. For example, a fingerprint may be recognized in an empty region 910 of the display unit 151 to which a graphic object is not output.

For example, as illustrated in (a) of FIG. 9, any one 900 of a plurality of home screen pages may be output to the display unit 151. In this case, the user's fingerprint on the empty space 910 of the display unit 151 to which a graphic object is not output may be recognized.

In this case, the controller 180 may additionally output a home screen page 920 among the plurality of home screen pages. In this case, pre-set applications may be output to the additionally output home screen pages 920. In this case, the user may execute the pre-set applications only in the additionally output home screen page 920.

For example, as illustrated in (b) of FIG. 9, an application related to personal information of the user may be output to the additionally output home screen page 920. For example, memory, diary, gallery applications, and the like, may be output.

In the above, the method for additionally outputting a home screen page by using fingerprint recognition has been described. In this manner, the user may set a home screen page that only the user himself or herself may access.

Figure 10:
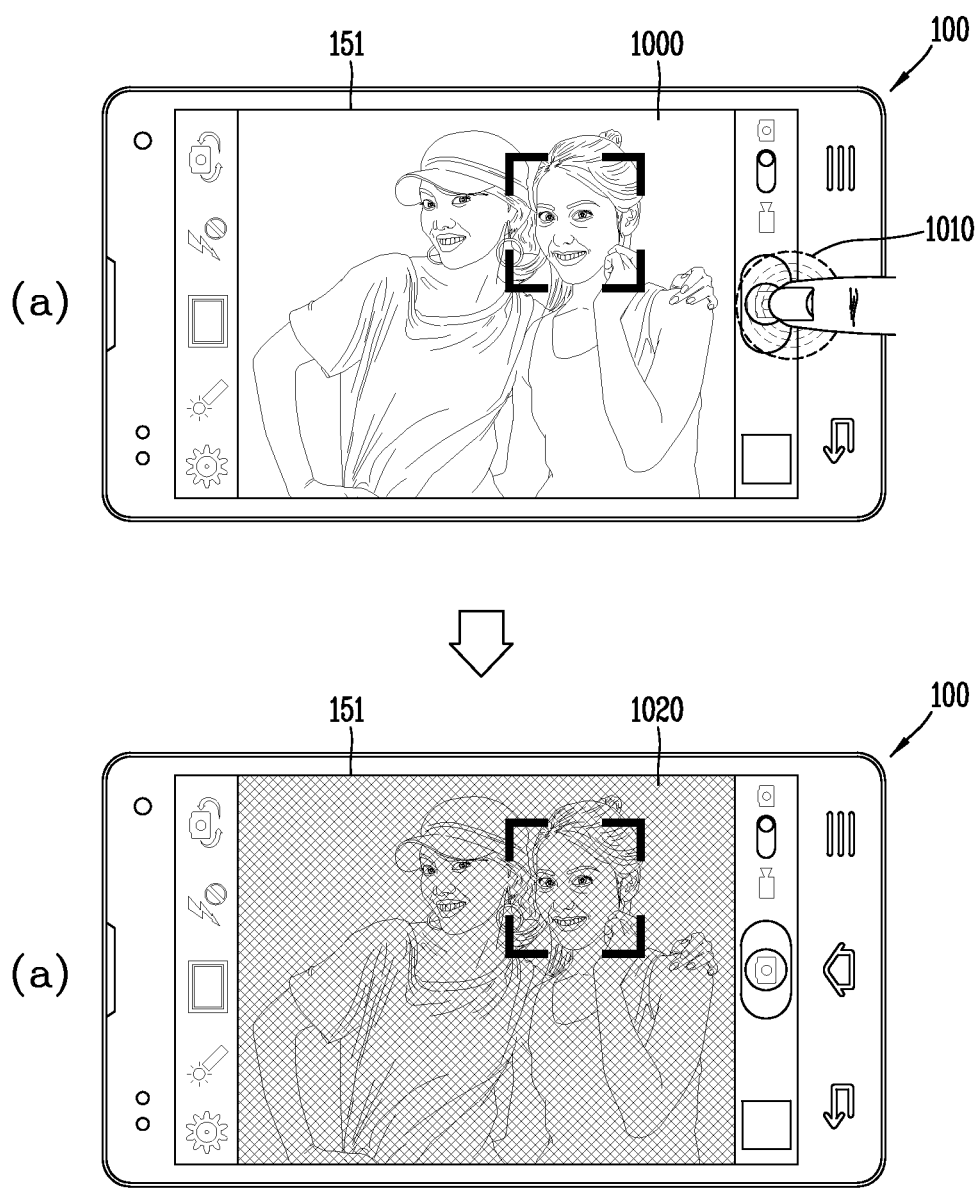
FIGS. 10A and 10B are conceptual views illustrating executing different functions according to user's finger.

Hereinafter, a method for using the fingerprint recognition function in executing a camera application will be described. FIG. 10 is a conceptual view illustrating a method for using the fingerprint recognition function while a camera application is being executed.

When a fingerprint is recognized, the controller 180 may execute a function matched to the recognized fingerprint. In this case, the matched function may be set in advance or may be set according to a user selection. For example, when a fingerprint is recognized while the camera application is being executed, a set value of an image may be changed to a set value of an image matched to the recognized fingerprint.

For example, as illustrated in (a) of FIG. 10, the camera application may be executed in the mobile terminal according to an exemplary embodiment of the present disclosure. In this case, a preview image 1000 received from the camera may be output to the display unit 151.

The user may apply a touch with his or her finger to a particular region of the display unit 151. When the touch is applied, the controller 180 may recognize the user finger's fingerprint. For example, as illustrated in (a) of FIG. 10, the controller 180 may recognize a fingerprint 1010 of the user's finger in a position where a camera button is present.

When the user finger's fingerprint is recognized, the controller 180 may change a set value of an image of the camera application to a set value of an image matched to the fingerprint recognition. For example, as illustrated in (b) of FIG. 10, the controller 180 may change a set value of a preview image being output to the display unit 151 to black and white 1020.

In the above, the method for changing a camera set value by using fingerprint recognition has been described. In this manner, the user may capture an image with a set value of his or her desired image by using only his or her fingerprint.

Figure 11A:
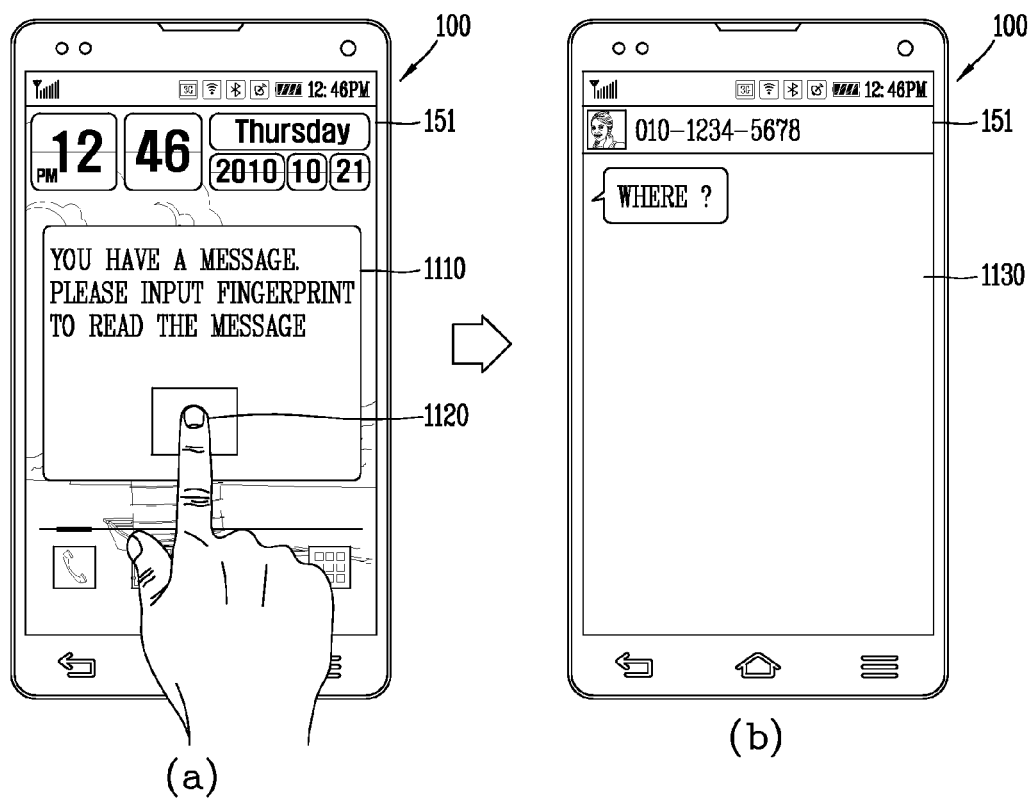

Hereinafter, a method for using different fingerprints for types of event that occur in the mobile terminal will be described. FIGS. 11A and 11B are conceptual views illustrating using of different fingerprints for types of event that occur in the mobile terminal.

The mobile terminal according to an exemplary embodiment of the present disclosure may further include a storage unit for storing a plurality of fingerprint information.

The controller 180 may match different functions to the plurality of stored fingerprint information. For example, in order to execute operations related to the events, the user may set different fingerprints for each of the types of event. Thereafter, when a fingerprint of a particular finger is recognized, the controller 180 may execute a function related to the event. For example, in case of a message read event, it may be set such that a message is read when a user's particular fingerprint is recognized.

For example, referring to (a) of FIG. 11A, when a message reception event 1110 occurs, the controller 180 may recognize a fingerprint 1120 of the user's index finger. In this case, when the fingerprint of the user's index finger is recognized, the controller 180 may output contents of a message.

Meanwhile, although not shown, if a fingerprint of a particular finger is not recognized, the controller 180 may not execute an operation related to an event. For example, when the message reception event occurs, if a fingerprint of the user's index finger is not recognized, the controller 180 may not output contents of the message.

In another example, as illustrated in (a) of FIG. 11B, an event 1140 related to payment may occur in the mobile terminal. In this case, when a fingerprint of a particular finger is recognized, the controller 180 may perform payment. For example, as illustrated in (a) of FIG. 11B, the user may apply a fingerprint 1150 of his or her thumb. In this case, when the fingerprint of the user's thumb is applied, the controller 180 may perform payment (1160) as illustrated in (b) of FIG. 11B.

In the above, the method for performing an operation related to an event by using fingerprints of different fingers for types of event has been described. In this manner, the user may execute various functions by using various fingerprints.

Figure 12A:
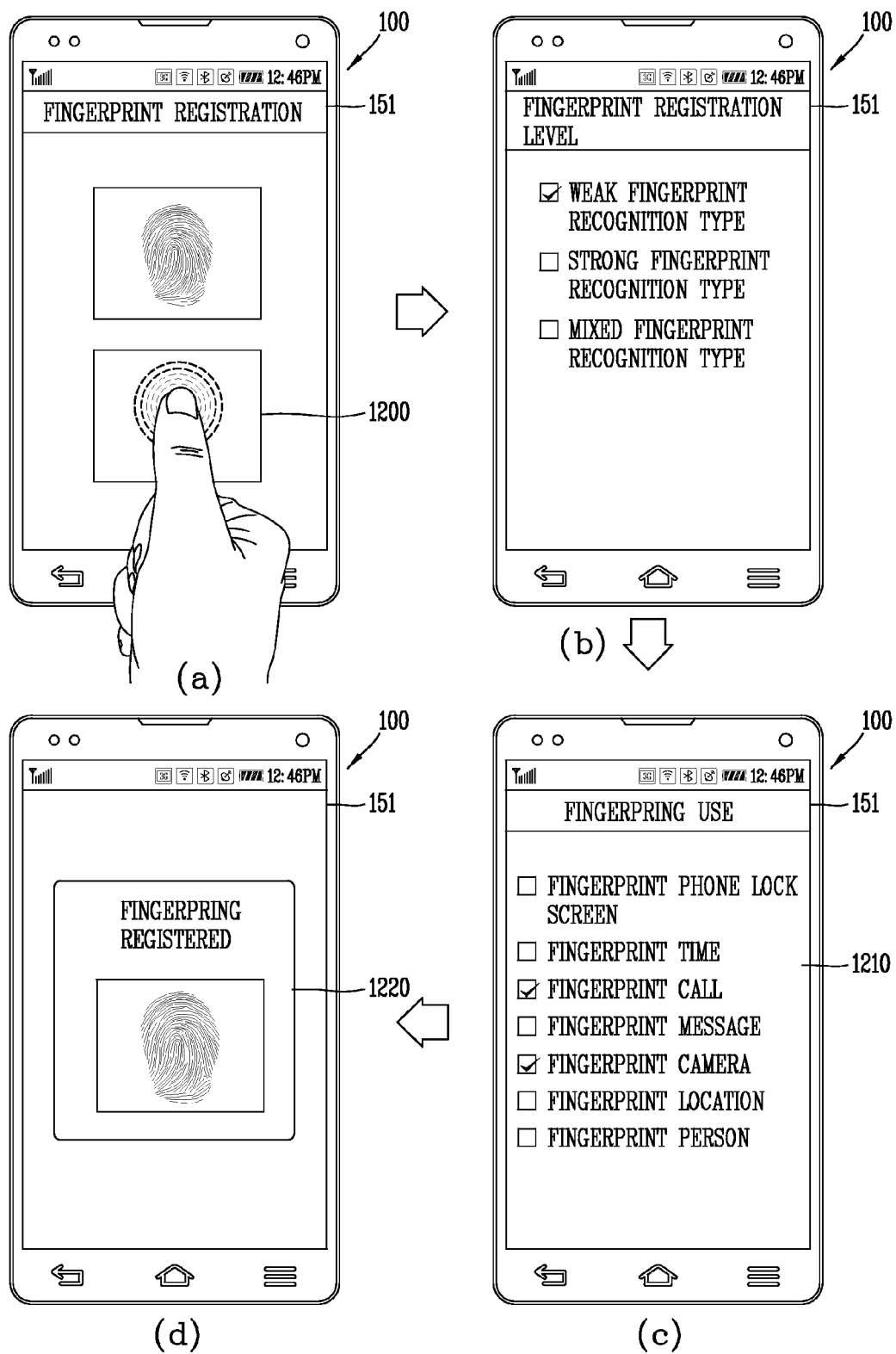
FIGS. 12A and 12B are conceptual views illustrating a method for registering a fingerprint.
Figure 12B:
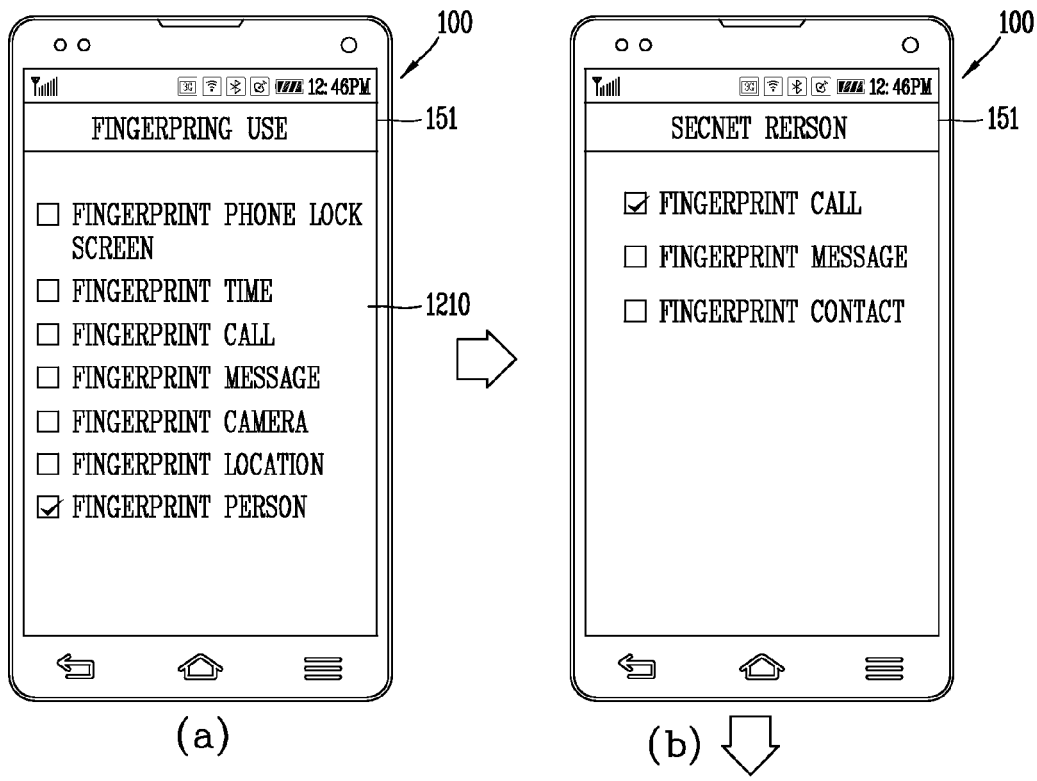
Figure 12B:
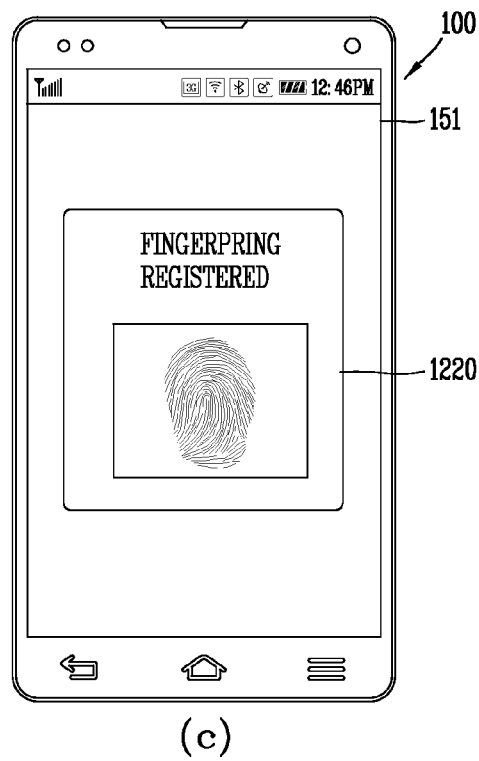

Hereinafter, a method for registering fingerprint information. FIGS. 12A and 12B are conceptual views illustrating a method for registering user's fingerprint.

The controller 180 may register fingerprint information and set an operation related to an event for using the fingerprint information during the registering process. Also, in this process, setting of the operation related to an event using the fingerprint information may be performed according to a user selection.

For example, as illustrated in (a) of FIG. 12A, the user may register (1200) a fingerprint by using a sensor (e.g., an optical sensor) disposed in a layered structure in the display unit 151.

Thereafter, the user may select a degree of the registered fingerprint recognition. For example, as illustrated in (b) of FIG. 12A, when the registered fingerprint is used, the controller 180 may output screen information for selecting a degree of the fingerprint recognition to the display unit 151 to allow the user may select a degree of fingerprint recognition.

After a degree of fingerprint recognition is selected, the user may select an operation for using the fingerprint recognition function. For example, as illustrated in (c) of FIG. 12A, the user may select at least one operation 1210 to be executed by using the fingerprint recognition function.

In another example, as illustrated in (a) of FIG. 12B, the user may select an event related to a particular person in order to use the registered fingerprint. Thereafter, as illustrated in (b) of FIG. 12B, the controller 180 may output screen information for selecting a sub-event of the event related to the particular person to the display unit 151. For example, the sub-event of the event related to the particular person may be a call event from the particular person, a message event received from the particular person, an event related to an address list of the particular person, and the like. After the sub-event is selected, as illustrated in (c) of FIG. 12B, the controller 180 may register the event and the fingerprint.

In the above, the method for registering a fingerprint and matching an operation for using the registered fingerprint has been described.

In exemplary embodiments of the present disclosure, whether to perform an operation of a mobile terminal may be determined according to a degree of user fingerprint recognition. Thus, the user may prevent someone else from using his or her mobile terminal, and by adjusting a degree of fingerprint recognition, a function used to quickly recognize a fingerprint and a function used to slowly recognize a fingerprint may be discriminated.

Also, by entering a different mode according to a degree of fingerprint recognition in a locked state, security of a mobile terminal can be strengthened.

In the exemplary embodiments of the present disclosure, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves (e.g., transmission via the Internet).

The mobile terminal according to the exemplary embodiments of the present disclosure is not limited in its application of the configurations and methods, but the entirety or a portion of the exemplary embodiments can be selectively combined to be configured into various modifications.

The invention claimed is:

1. A mobile terminal capable of performing a fingerprint recognition function, the mobile terminal comprising:
 a display configured to sense a touch input by a user's finger;
 a fingerprint sensor configured to sense a fingerprint of the user's finger when the user's finger touches the display, when the fingerprint recognition function is being executed; and
 a controller configured to:
  set different fingerprint recognition thresholds according to types of events that occur in the mobile terminal;
  detect an occurrence of an event in the mobile terminal;
  sense, via the fingerprint sensor, the fingerprint of the user's finger;
  output, via the display, a pop-up window to improve a recognition rate of the sensed fingerprint while the fingerprint of the user's finger is being sensed when a set fingerprint recognition threshold, among the set fingerprint recognition thresholds, related to the detected event is greater than a particular value;
  compare between the set fingerprint recognition threshold and the recognition rate of the sensed fingerprint; and
  execute an operation related to the detected event that occurs in the mobile terminal when the recognition rate of the sensed fingerprint is greater than the set fingerprint recognition threshold,
 wherein the controller is further configured to:
  display the pop-up window when the touch input for fingerprint recognition is applied to the display based on the set fingerprint recognition threshold related to the detected event being greater than the particular value; and
  compare between the set fingerprint recognition threshold and the recognition rate of the sensed fingerprint while the pop-up window is being displayed.

2. The mobile terminal of claim 1, wherein
the recognition rate of the sensed fingerprint is a degree by which the sensed fingerprint is identical to a previously stored fingerprint.

3. The mobile terminal of claim 1, wherein
a first event type of event is an event for receiving a message from a particular person, and
a second event type of event is an event related to a payment.

4. The mobile terminal of claim 1, wherein
when the recognition rate of the sensed fingerprint is not greater than the set fingerprint recognition threshold related to the detected event, the controller limits performing of the operation related to the detected event.

5. The mobile terminal of claim 1, wherein
when a state of the mobile terminal meets a particular operating condition,
the controller executes the fingerprint recognition function such that whether to perform the operation related to the detected event is determined according to whether the recognition rate of the sensed fingerprint is greater than the set fingerprint recognition threshold among the set different fingerprint recognition thresholds related to the particular operating condition.

6. The mobile terminal of claim 5, wherein the particular operating condition is at least one of a particular position or a particular time slot.

7. The mobile terminal of claim 1, wherein
when the mobile terminal is in a locked state, a lock screen that limits a user control command is output to the display,
when the user's finger touches the display, the controller releases the locked state based on comparing between the set fingerprint recognition threshold related to the detected event and the recognition rate of the sensed fingerprint of the user's finger, and
after the locked state is released, the controller enters one of a first mode or a second mode in which functions that the user accesses are different according to comparing between the set fingerprint recognition threshold related to the detected event and the recognition rate of the sensed fingerprint.

8. The mobile terminal of claim 7, wherein
when the recognition rate of the sensed fingerprint is greater than a first fingerprint recognition threshold among the set different fingerprint recognition thresholds, the controller enters the first mode in which a function related to personal information is accessed, and
when the recognition rate of the sensed fingerprint is greater than a second fingerprint recognition threshold among the set different fingerprint recognition thresholds, the controller enters the second mode in which a function related to a payment is accessed.

9. The mobile terminal of claim 8, wherein when the recognition rate of the sensed fingerprint of the user's finger is not greater than the first and second fingerprint recognition threshold, the controller enters a third mode in which a function unrelated to payments or accessing personal information is accessed.

10. The mobile terminal of claim 1, wherein
any one of a plurality of home screen pages is output to the display, and
when the recognition rate of the sensed fingerprint of the user's finger is greater than the set fingerprint recognition threshold among the set different fingerprint recognition thresholds, the controller additionally outputs a home screen page which is not included in the plurality of home screen pages and which has not been output before determining that the recognition rate of the sensed fingerprint is greater than the set fingerprint recognition threshold.

11. The mobile terminal of claim 1, wherein a region of the display at which the fingerprint recognition function is being executed is an empty region of the display to which a graphic object is not output.

12. The mobile terminal of claim 1, wherein
the event relates to executing a camera application, and
when the recognition rate of the sensed fingerprint of the user's finger is greater than the set fingerprint recognition threshold among the set different fingerprint recognition thresholds for the camera application while the camera application is being executed, the controller controls the camera to obtain an image corresponding to a pre-set value.

13. The mobile terminal of claim 1, wherein the pop-up window is not displayed when the set fingerprint recognition threshold related to the detected event is not greater than the particular value.

14. The mobile terminal of claim 1, wherein the controller is further configured to:
display, when the set fingerprint recognition threshold related to the detected event is greater than the particular value, the pop-up window for a time period for the fingerprint sensor to sense the fingerprint sufficiently to determine whether the recognition rate of the sensed fingerprint satisfies the set fingerprint recognition threshold that is greater than a particular value.

15. The mobile terminal of claim 1, wherein the pop-up window provides an indication that the fingerprint sensor is sensing the fingerprint of the user's finger.

\* \* \* \* \*